United States Patent
Yu et al.

(10) Patent No.: US 12,167,042 B2
(45) Date of Patent: Dec. 10, 2024

(54) METHOD AND SYSTEM FOR DECODING/ENCODING VIDEO INCLUDING SEQUENCE PICTURES

(71) Applicant: GUANGDONG OPPO MOBILE TELECOMMUNICATIONS CORP., LTD., Dongguan (CN)

(72) Inventors: Yue Yu, Palo Alto, CA (US); Haoping Yu, Palo Alto, CA (US)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 18/401,142

(22) Filed: Dec. 29, 2023

(65) Prior Publication Data

US 2024/0137567 A1 Apr. 25, 2024

Related U.S. Application Data

(63) Continuation of application No. PCT/US2022/036360, filed on Jul. 7, 2022.
(Continued)

(51) Int. Cl.
*H04N 19/70* (2014.01)
*H04N 19/167* (2014.01)
(Continued)

(52) U.S. Cl.
CPC .......... *H04N 19/70* (2014.11); *H04N 19/167* (2014.11); *H04N 19/172* (2014.11); *H04N 19/174* (2014.11)

(58) Field of Classification Search
CPC .... H04N 19/70; H04N 19/167; H04N 19/172; H04N 19/174
See application file for complete search history.

(56) References Cited

U.S. PATENT DOCUMENTS

| | | | |
|---|---|---|---|
| 2010/0091840 A1 | 4/2010 | Gao | |
| 2013/0301738 A1 | 11/2013 | Kim | |

(Continued)

FOREIGN PATENT DOCUMENTS

WO WO-2023272533 A1 * 1/2023 ........... H04N 19/103

OTHER PUBLICATIONS

International Search Report in the international application No. PCT/US2022/036360, mailed on Oct. 6, 2022. 2 pages.
(Continued)

*Primary Examiner* — Fabio S Lima
(74) *Attorney, Agent, or Firm* — BAYES PLLC

(57) ABSTRACT

Method for decoding a video including a sequence of pictures includes: a bitstream is parsed to obtain a value of a first flag; whether the value of the first flag indicates that a set of header extension parameters is present is determined; when the value of the first flag indicates that the set of header extension parameters is present, the bitstream is parsed to obtain a value of a second flag; whether the value of the second flag indicates that a first parameter in the set of header extension parameters is enabled for the sequence of pictures is determined; when the determination result is yes, the bitstream is parsed to obtain a value of the first parameter for one of the slices in the sequence of pictures; and the slice is decoded based on the value of the first parameter for the slice.

20 Claims, 13 Drawing Sheets

Related U.S. Application Data

(60) Provisional application No. 63/219,173, filed on Jul. 7, 2021.

(51) Int. Cl.
*H04N 19/172* (2014.01)
*H04N 19/174* (2014.01)

(56) References Cited

U.S. PATENT DOCUMENTS

| | | |
|---|---|---|
| 2014/0211841 A1 | 7/2014 | Samuelsson |
| 2020/0322610 A1 | 10/2020 | Leleannec |
| 2022/0217352 A1* | 7/2022 | Samuelsson ........... H04N 19/46 |
| 2023/0026492 A1* | 1/2023 | Ikai ........................ H04N 19/70 |
| 2023/0097659 A1* | 3/2023 | Choi ...................... H04N 19/12 |
| | | 375/240.18 |

OTHER PUBLICATIONS

Written Opinion of the International Search Authority in the international application No. PCT/US2022/036360, mailed on Oct. 6, 2022. 8 pages.

Joint Video Experts Team (JVET) of ITU-T SG 16 WP 3 and ISO/IEC JTC 1/SC 29, 20th Meeting, by teleconference, Oct. 7-16, 2020, Document: JVET-T2001-v2, Title: Versatile Video Coding Editorial Refinements on Draft 10, Status: Output document approved by JVET, Author(s) or Contact(s): Benjamin Bross, Jianle Chen, Shan Liu, Ye-Kui Wang, Source: Editors. pp. 25-437. 513 pages.

Joint Video Experts Team (JVET) of ITU-T SG 16 WP 3 and ISO/IEC JTC 1/SC 29, 23rd Meeting, by teleconference, Jul. 7-16, 2021, Document: JVET-W0070, Title: [AHG8] SPS Cleanup for VVC operation range extension, Status: Input document to JVET, Author(s) or Contact(s): Karam Naser, Franck Galpin, Tangi Poirier, Fabrice Le Leannec, Source: InterDigital. the whole document. 4 pages.

Joint Video Experts Team (JVET) of ITU-T SG 16 WP 3 and ISO/IEC JTC 1/SC 29, 23rd Meeting, by teleconference, Jul. 7-16, 2021, Document: JVET-W0046, Title: CE-1.1: coding of last significant coefficient position for high bit depth and high bit rate extensions, Status: Input document to JVET, Author(s) or Contact(s): Fan Wang, Luhang Xu, Zhihuang Xie, Yue Yu, Haoping Yu, Dong Wan, Source: OPPO. the whole document. 7 pages.

Joint Video Experts Team (JVET) of ITU-T SG 16 WP 3 and ISO/IEC JTC 1/SC 29, 23rd Meeting, by teleconference, Jul. 7-16, 2021, Document: JVET-W0117-v3, Title: CE-3 related: a slice level high throughput mode, Status: Input document to JVET, Author(s) or Contact(s): Fan Wang, Zhihuang Xie, Yue Yu, Haoping Yu, Dong Wang, Source: OPPO. the whole document. 6 pages.

Joint Video Experts Team (JVET) of ITU-T SG 16 WP 3 and ISO/IEC JTC 1/SC 29, 23rd Meeting, by teleconference, Jul. 7-16, 2021, Document: JVET-W0093-v2, Title: AHG8: On significance, GT1, and GT2 flag coding for high bit depths, Status: Input document, Author(s) or Contact(s): Adrian Browne, Steve Keating, Karl Sharman, Source: Sony Europe BV. the whole document. 24 pages.

* cited by examiner

504

506

508

METHOD AND SYSTEM FOR DECODING/ENCODING VIDEO INCLUDING SEQUENCE PICTURES

CROSS-REFERENCE TO RELATED APPLICATIONS

This application is a continuation of International Application No. PCT/US2022/036360, entitled "SEQUENCE-LEVEL AND SLICE-LEVEL SYNTAX REPRESENTATION IN VIDEO CODING", filed on Jul. 7, 2022, which claims the benefit of priority to U.S. Provisional Application No. 63/219,173, entitled "REPRESENTATION OF SEVERAL SPS AND SLICE RELATED SYNTAX ELEMENTS FOR VIDEO CODING," filed on Jul. 7, 2021, both of which are incorporated herein by reference in their entireties.

BACKGROUND

Embodiments of the present disclosure relate to video coding.

Digital video has become mainstream and is being used in a wide range of applications including digital television, video telephony, and teleconferencing. These digital video applications are feasible because of the advances in computing and communication technologies as well as efficient video coding techniques. Various video coding techniques may be used to compress video data, such that coding on the video data can be performed using one or more video coding standards. Exemplary video coding standards may include, but not limited to, versatile video coding (H.266/VVC), high-efficiency video coding (H.265/HEVC), advanced video coding (H.264/AVC), moving picture expert group (MPEG) coding, to name a few.

SUMMARY

According to one aspect of the present disclosure, a method for decoding a video is disclosed. The video includes a sequence of pictures, and each picture includes one or more slices. A bitstream is parsed by a processor to obtain a value of a first flag. Whether the value of the first flag indicates that a set of header extension parameters is present is determined by the processor. In response to the value of the first flag indicating that the set of header extension parameters is present, the bitstream is parsed by the processor to obtain a value of a second flag. Whether the value of the second flag indicates that a first parameter in the set of header extension parameters is enabled for the sequence of pictures is determined by the processor. In response to the value of the second flag indicating that the first parameter is enabled for the sequence of pictures, the bitstream is parsed to obtain a value of the first parameter for one of the slices in the sequence of pictures. The slice is decoded by the processor based on the value of the first parameter for the slice.

According to another aspect of the present disclosure, a system for decoding a video includes a memory configured to store instructions and a processor coupled to the memory. The video includes a sequence of pictures, and each picture includes one or more slices. The processor is configured to, upon executing the instructions, parse a bitstream to obtain a value of a first flag. The processor is also configured to, upon executing the instructions, determine whether the value of the first flag indicates that a set of header extension parameters is present, and in response to the value of the first flag indicating that the set of header extension parameters is present, parse the bitstream to obtain a value of a second flag. The processor is further configured to, upon executing the instructions, determine whether the value of the second flag indicates that a first parameter in the set of header extension parameters is enabled for the sequence of pictures, and in response to the value of the second flag indicating that the first parameter is enabled for the sequence of pictures, parse the bitstream to obtain a value of the first parameter for one of the slices in the sequence of pictures. The processor is further configured to, upon executing the instructions, decode the slice based on the value of the first parameter for the slice.

According to still another aspect of the present disclosure, a method for encoding a video is disclosed. The video includes a sequence of pictures, and each picture includes one or more slices. A value of a first parameter in a set of header extension parameters for at least one of the slices in the sequence of pictures. is determined by a processor. A value of a first flag indicative of whether the set of header extension parameters is present is determined by the processor based on the value of the first parameter. A value of a second flag indicative of whether the first parameter is enabled for the sequence of pictures is determined based on the value of the first parameter. The at least one slice is encoded by the processor based on the value of the first parameter into a bitstream. The values of the first flag, the second flag, and the first parameter are encoded by the processor into the bitstream.

According to yet another aspect of the present disclosure, a system for encoding a video includes a memory configured to store instructions and a processor coupled to the memory. The video includes a sequence of pictures, and each picture includes one or more slices. The processor is configured to, upon executing the instructions, determine a value of a first parameter in a set of header extension parameters for at least one of the slices in the sequence of pictures. The processor is also configured to, upon executing the instructions, determine a value of a first flag indicative of whether the set of header extension parameters is present based on the value of the first parameter. The processor is further configured to, upon executing the instructions, determine a value of a second flag indicative of whether the first parameter is enabled for the sequence of pictures based on the value of the first parameter. The processor is further configured to, upon executing the instructions, encode the at least one slice based on the value of the first parameter into a bitstream, and encode the values of the first flag, the second flag, and the first parameter into the bitstream.

These illustrative embodiments are mentioned not to limit or define the present disclosure, but to provide examples to aid understanding thereof. Additional embodiments are described in the Detailed Description, and further description is provided there.

BRIEF DESCRIPTION OF THE DRAWINGS

The accompanying drawings, which are incorporated herein and form a part of the specification, illustrate embodiments of the present disclosure and, together with the description, further serve to explain the principles of the present disclosure and to enable a person skilled in the pertinent art to make and use the present disclosure.

Figure 1:
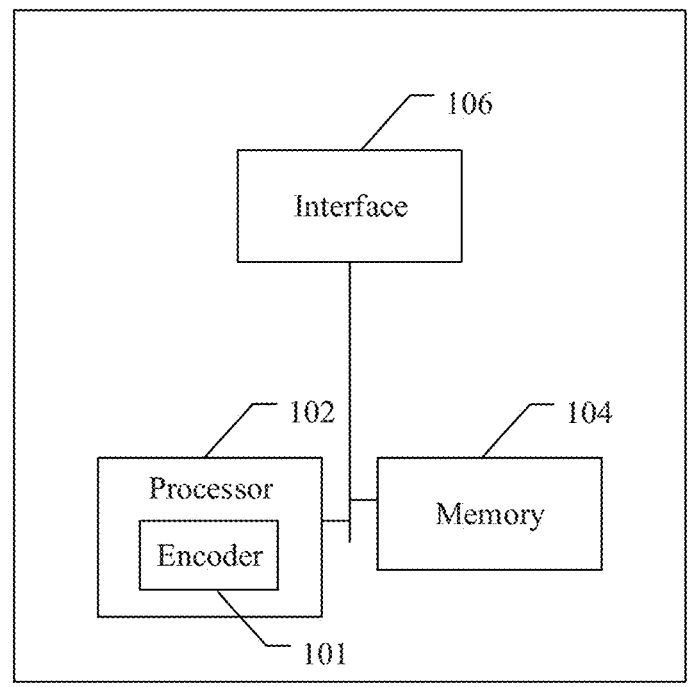
FIG. 1 illustrates a block diagram of an exemplary encoding system, according to some embodiments of the present disclosure.

Embodiments of the present disclosure will be described with reference to the accompanying drawings.

DETAILED DESCRIPTION

Although some configurations and arrangements are discussed, it should be understood that this is done for illustrative purposes only. A person skilled in the pertinent art will recognize that other configurations and arrangements can be used without departing from the spirit and scope of the present disclosure. It will be apparent to a person skilled in the pertinent art that the present disclosure can also be employed in a variety of other applications.

It is noted that references in the specification to "one embodiment," "an embodiment," "an example embodiment," "some embodiments," "certain embodiments," etc., indicate that the embodiment described may include a particular feature, structure, or characteristic, but every embodiment may not necessarily include the particular feature, structure, or characteristic. Moreover, such phrases do not necessarily refer to the same embodiment. Further, when a particular feature, structure, or characteristic is described in connection with an embodiment, it would be within the knowledge of a person skilled in the pertinent art to effect such feature, structure, or characteristic in connection with other embodiments whether or not explicitly described.

In general, terminology may be understood at least in part from usage in context. For example, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Various aspects of video coding systems will now be described with reference to various apparatus and methods. These apparatus and methods will be described in the following detailed description and illustrated in the accompanying drawings by various modules, components, circuits, steps, operations, processes, algorithms, etc. (collectively referred to as "elements"). These elements may be implemented using electronic hardware, firmware, computer software, or any combination thereof. Whether such elements are implemented as hardware, firmware, or software depends upon the particular application and design constraints imposed on the overall system.

The techniques described herein may be used for various video coding applications. As described herein, video coding includes both encoding and decoding a video. Encoding and decoding of a video can be performed by the unit of block. For example, an encoding/decoding process such as transform, quantization, prediction, in-loop filtering, reconstruction, or the like may be performed on a coding block, a transform block, or a prediction block. As described herein, a block to be encoded/decoded will be referred to as a "current block." For example, the current block may represent a coding block, a transform block, or a prediction block according to a current encoding/decoding process. In addition, it is understood that the term "unit" used in the present disclosure indicates a basic unit for performing a specific encoding/decoding process, and the term "block" indicates a sample array of a predetermined size. Unless otherwise stated, the "block" and "unit" may be used interchangeably.

In video coding, quantization is used to reduce the dynamic range of transformed or non-transformed video signals so that fewer bits will be used to represent video signals. Before quantization, the transformed or non-transformed video signal at a specific position is referred to as a "coefficient." After quantization, the quantized value of the coefficient is referred to as a "quantization level" or "level." In the present disclosure, a quantization level of a position refers to the quantization level of a coefficient at the position. Residual coding is used to encode the quantization levels of positions into a bitstream in video coding. After quantization, there are N×M quantization levels for an N×M coding block. These N×M quantization levels may be zero or non-zero values. The non-zero levels will further be converted (e.g., binarized) to a binary representation (e.g., binary bins) using binarization methods if the levels are not binary. The binary representation (e.g., binary bins) will then be compressed into the bitstream using coding algorithms (e.g., entropy coding algorithms). Examples of the binarization methods include, but are not limited to, Golomb-Rice binarization, such as combined truncated Rice (TR) and limited k-th order Exp-Golomb (EGk) binarization and k-th order Exp-Golomb binarization. Examples of the entropy encoding algorithms include, but are not limited to, a variable-length coding (VLC) scheme, a context-adaptive VLC scheme (CAVLC), an arithmetic coding scheme, a binarization, a context adaptive binary arithmetic coding (CABAC), syntax-based context-adaptive binary arithmetic coding (SBAC), probability interval partitioning entropy (PIPE) coding, or other entropy encoding techniques.

Besides the representation of levels (or coefficients in some cases), the representation of other information (e.g., syntax elements) used for video coding may be coded in the bitstream as well. Since video coding is organized in different levels by dividing a video into different pieces (e.g., sequence, pictures, slices, etc.), the representation of syntax element are also arranged in different levels (e.g., sequence-level, picture-level, slice-level), for example, as the corresponding header information. Moreover, multiple condition checks may be required for parsing some syntax elements in video coding, which further increases the complexity of organizing and parsing the representation of syntax elements.

The present disclosure provides various schemes to improve the efficiency and reduce the complexity of organizing and parsing the representation of syntax elements in video coding. According to some aspects of the present disclosure, various syntax elements at different levels (e.g., sequence-level flags and slice-level flags) in combination with corresponding condition checks at the different levels can be used to organize and parse certain optional parameters (e.g., header extension parameters) in a simplified, efficient manner. In some embodiments, a flag is used to indicate the presence of a set of header extension parameters. The header extension parameters may include various parameters that may be associated with some sequences of pictures, but not associated with other sequences of pictures. In some embodiments, a sequence-level flag is used for each parameter in the set of header extension parameters to indicate whether the corresponding parameter is enabled for a particular sequence of pictures in the video if the set of header extension parameters is present. In some embodiments, a slice-level syntax element is used for each parameter to indicate the value of the parameter for coding a particular slice in the sequence of pictures if the parameter is enabled at the sequence level.

According to some aspects of the present disclosure, the representation of different syntax elements under the same condition check at the same level can be grouped together to reduce the number of condition checks, thereby further simplifying the scheme.

Figure 2:
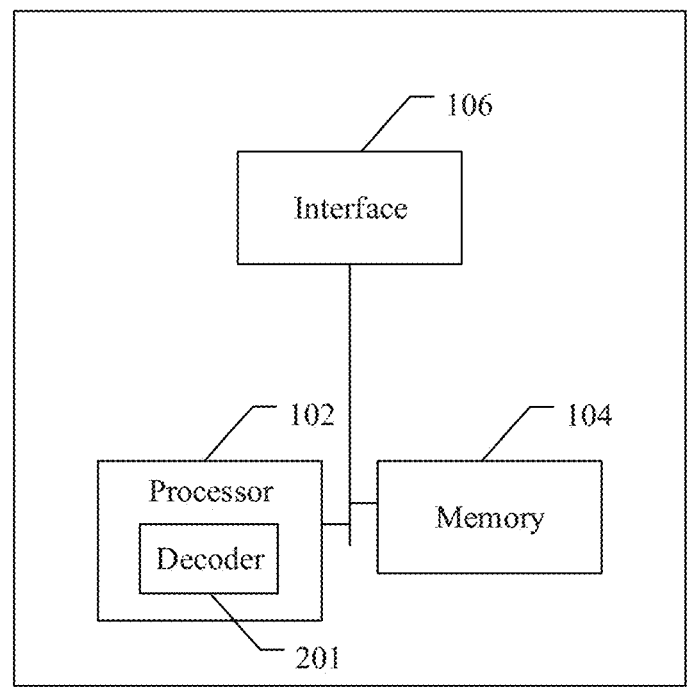
FIG. 2 illustrates a block diagram of an exemplary decoding system, according to some embodiments of the present disclosure.

FIG. 1 illustrates a block diagram of an exemplary encoding system 100, according to some embodiments of the present disclosure. FIG. 2 illustrates a block diagram of an exemplary decoding system 200, according to some embodiments of the present disclosure. Each system 100 or 200 may be applied or integrated into various systems and apparatus capable of data processing, such as computers and wireless communication devices. For example, system 100 or 200 may be the entirety or part of a mobile phone, a desktop computer, a laptop computer, a tablet, a vehicle computer, a gaming console, a printer, a positioning device, a wearable electronic device, a smart sensor, a virtual reality (VR) device, an argument reality (AR) device, or any other suitable electronic devices having data processing capability. As shown in FIGS. 1 and 2, system 100 or 200 may include a processor 102, a memory 104, and an interface 106. These components are shown as connected to one another by a bus, but other connection types are also permitted. It is understood that system 100 or 200 may include any other suitable components for performing functions described here.

Processor 102 may include microprocessors, such as graphic processing unit (GPU), image signal processor (ISP), central processing unit (CPU), digital signal processor (DSP), tensor processing unit (TPU), vision processing unit (VPU), neural processing unit (NPU), synergistic processing unit (SPU), or physics processing unit (PPU), microcontroller units (MCUs), application-specific integrated circuits (ASICs), field-programmable gate arrays (FPGAs), programmable logic devices (PLDs), state machines, gated logic, discrete hardware circuits, and other suitable hardware configured to perform the various functions described throughout the present disclosure. Although only one processor is shown in FIGS. 1 and 2, it is understood that multiple processors can be included. Processor 102 may be a hardware device having one or more processing cores. Processor 102 may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. Software can include computer instructions written in an interpreted language, a compiled language, or machine code. Other techniques for instructing hardware are also permitted under the broad category of software.

Memory 104 can broadly include both memory (a.k.a, primary/system memory) and storage (a.k.a., secondary memory). For example, memory 104 may include random-access memory (RAM), read-only memory (ROM), static RAM (SRAM), dynamic RAM (DRAM), ferro-electric RAM (FRAM), electrically erasable programmable ROM (EEPROM), compact disc read-only memory (CD-ROM) or other optical disk storage, hard disk drive (HDD), such as magnetic disk storage or other magnetic storage devices, Flash drive, solid-state drive (SSD), or any other medium that can be used to carry or store desired program code in the form of instructions that can be accessed and executed by processor 102. Broadly, memory 104 may be embodied by any computer-readable medium, such as a non-transitory computer-readable medium. Although only one memory is shown in FIGS. 1 and 2, it is understood that multiple memories can be included.

Interface 106 can broadly include a data interface and a communication interface that is configured to receive and transmit a signal in a process of receiving and transmitting information with other external network elements. For example, interface 106 may include input/output (I/O) devices and wired or wireless transceivers. Although only one memory is shown in FIGS. 1 and 2, it is understood that multiple interfaces can be included.

Processor 102, memory 104, and interface 106 may be implemented in various forms in system 100 or 200 for performing video coding functions. In some embodiments, processor 102, memory 104, and interface 106 of system 100 or 200 are implemented (e.g., integrated) on one or more system-on-chips (SoCs). In one example, processor 102, memory 104, and interface 106 may be integrated on an application processor (AP) SoC that handles application processing in an operating system (OS) environment, including running video encoding and decoding applications. In another example, processor 102, memory 104, and interface 106 may be integrated on a specialized processor chip for video coding, such as a GPU or ISP chip dedicated to image and video processing in a real-time operating system (RTOS).

As shown in FIG. 1, in encoding system 100, processor 102 may include one or more modules, such as an encoder 101. Although FIG. 1 shows that encoder 101 is within one processor 102, it is understood that encoder 101 may include one or more sub-modules that can be implemented on different processors located closely or remotely with each other. Encoder 101 (and any corresponding sub-modules or sub-units) can be hardware units (e.g., portions of an integrated circuit) of processor 102 designed for use with other components or software units implemented by processor 102 through executing at least part of a program, i.e., instructions. The instructions of the program may be stored on a computer-readable medium, such as memory 104, and when executed by processor 102, it may perform a process having one or more functions related to video encoding, such as picture partitioning, inter prediction, intra prediction, transformation, quantization, filtering, entropy encoding, etc., as described below in detail.

Similarly, as shown in FIG. 2, in decoding system 200, processor 102 may include one or more modules, such as a decoder 201. Although FIG. 2 shows that decoder 201 is within one processor 102, it is understood that decoder 201 may include one or more sub-modules that can be implemented on different processors located closely or remotely with each other. Decoder 201 (and any corresponding sub-modules or sub-units) can be hardware units (e.g., portions of an integrated circuit) of processor 102 designed for use with other components or software units implemented by processor 102 through executing at least part of a program, i.e., instructions. The instructions of the program may be stored on a computer-readable medium, such as memory 104, and when executed by processor 102, it may perform a process having one or more functions related to video decoding, such as entropy decoding, inverse quantization, inverse transformation, inter prediction, intra prediction, filtering, as described below in detail.

Figure 3:
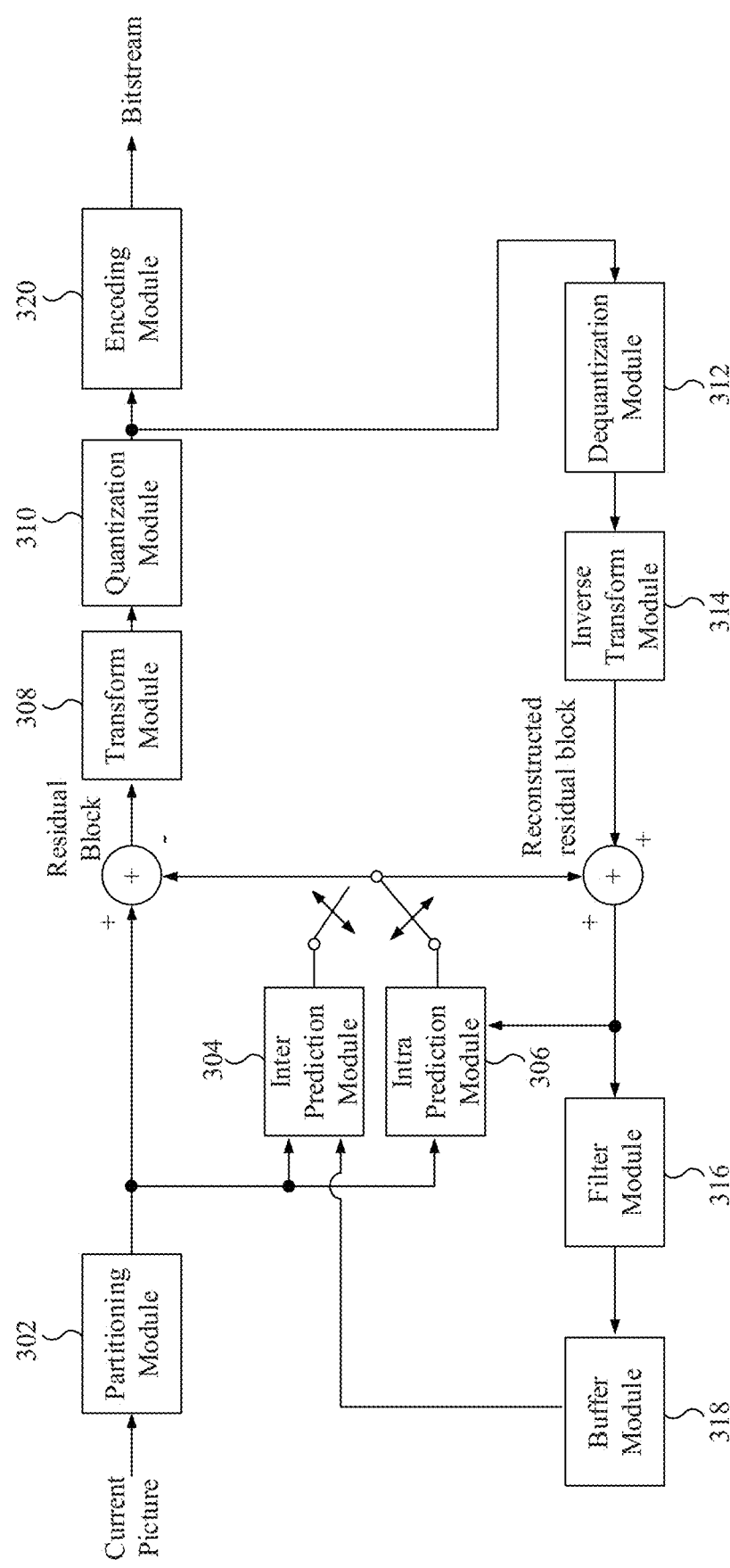
FIG. 3 illustrates a detailed block diagram of an exemplary encoder in the encoding system in FIG. 1, according to some embodiments of the present disclosure.

FIG. 3 illustrates a detailed block diagram of exemplary encoder 101 in encoding system 100 in FIG. 1, according to some embodiments of the present disclosure. As shown in FIG. 3, encoder 101 may include a partitioning module 302, an inter prediction module 304, an intra prediction module 306, a transform module 308, a quantization module 310, a dequantization module 312, an inverse transform module 314, a filter module 316, a buffer module 318, and an encoding module 320. It is understood that each of the elements shown in FIG. 3 is independently shown to represent characteristic functions different from each other in a video encoder, and it does not mean that each component is formed by the configuration unit of separate hardware or single software. That is, each element is included to be listed as an element for convenience of explanation, and at least two of the elements may be combined to form a single element, or one element may be divided into a plurality of elements to perform a function. It is also understood that some of the elements are not necessary elements that perform functions described in the present disclosure but instead may be optional elements for improving performance. It is further understood that these elements may be implemented using electronic hardware, firmware, computer software, or any combination thereof. Whether such elements are implemented as hardware, firmware, or software depends upon the particular application and design constraints imposed on encoder 101.

Partitioning module 302 may be configured to partition an input picture of a video into at least one processing unit. A picture can be a frame of the video or a field of the video. As shown in FIGS. 5A-5D, a video may be divided into pieces at different levels for video coding. For example, in FIG. 5A, a video 500 may be divided into one or more sequences 502, and each sequence 502 may include one or more pictures 504. In some embodiments, picture 504 includes an array of luma samples in monochrome format, or an array of luma samples and two corresponding arrays of chroma samples. At this point, the processing unit may be a prediction unit (PU), a transform unit (TU), or a coding unit (CU). Partitioning module 302 may partition a picture into a combination of a plurality of coding units, prediction units, and transform units, and encode a picture by selecting a combination of a coding unit, a prediction unit, and a transform unit based on a predetermined criterion (e.g., a cost function).

Figure 5A:
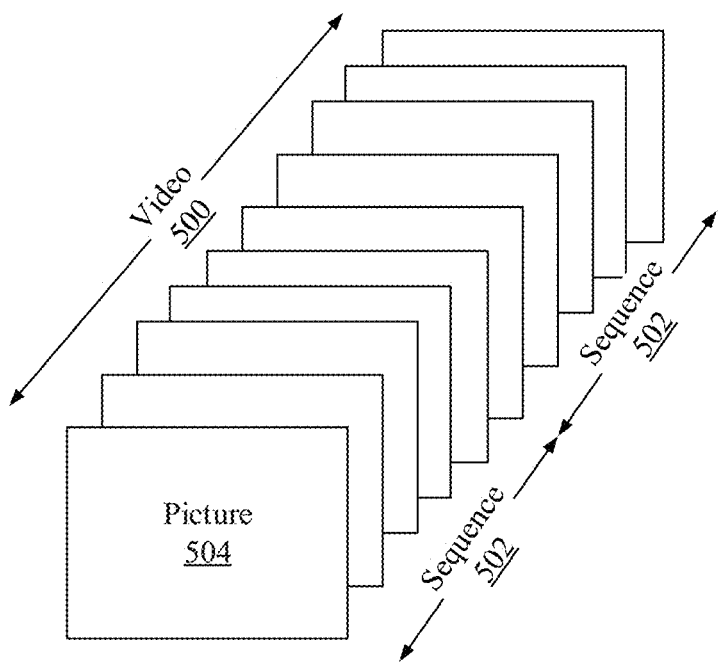
FIG. 5A illustrates an exemplary video divided into sequences of pictures picture, according to some embodiments of the present disclosure.
Figure 5B:
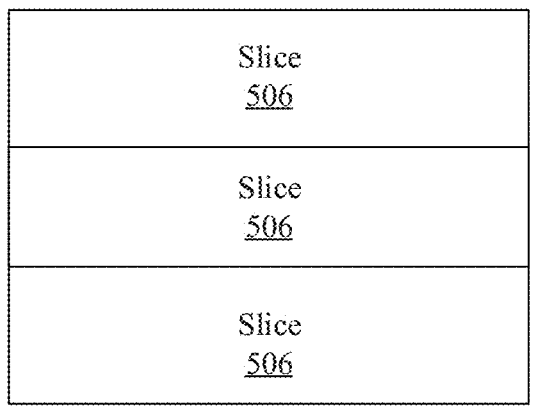
FIG. 5B illustrates an exemplary picture divided into slices, according to some embodiments of the present disclosure.

In some embodiments, for example, as shown in FIG. 5B, picture 504 is divided into one or more slices 506 by partitioning module 302. It is understood that the shape of slice 506 and the number of slices 506 in each picture 504 may vary in different examples. Each slice 506 can be as large as its root picture 504 or be subdivisions of root picture 504, according to some embodiments.

Figure 5C:
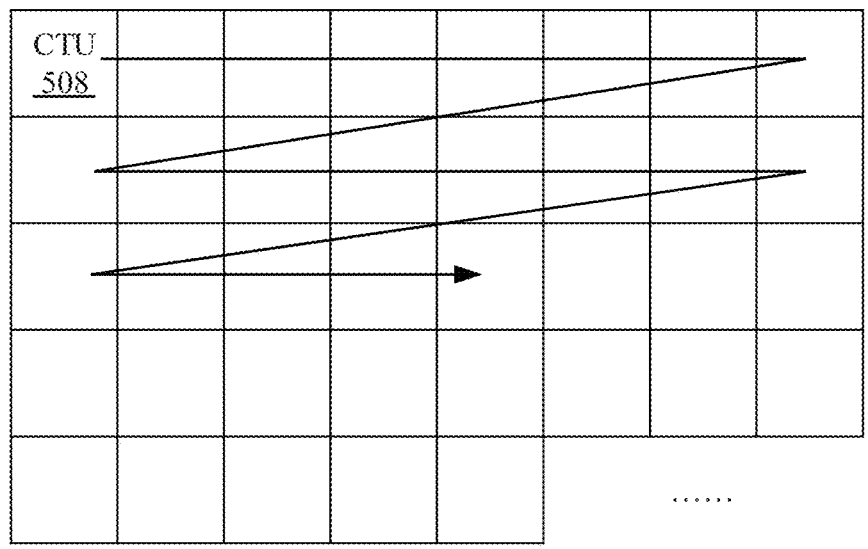
FIG. 5C illustrates an exemplary slice divided into coding tree units (CTUs), according to some embodiments of the present disclosure.
Figure 5D:
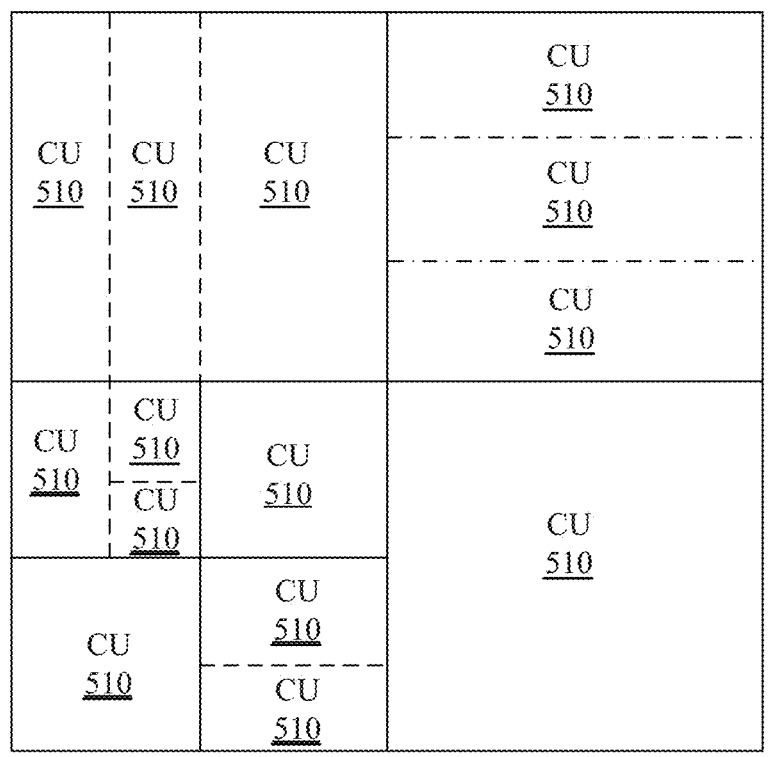
FIG. 5D illustrates an exemplary CTU divided into coding units (CUs), according to some embodiments of the present disclosure.

Similar to H.265/HEVC, H.266/VVC is a block-based hybrid spatial and temporal predictive coding scheme. As shown in FIG. 5C, during encoding, slice 506 may be further divided into square blocks— CTUs 508, by partitioning module 302. For example, CTUs 508 can be blocks of 128×128 pixels. In other words, slice 506 may include a number of CTUs 508. As shown in FIG. 5D, each CTU 508 can be further partitioned by partitioning module 302 into one or more CUs 510, which can be used for prediction and transformation. Unlike H.265/HEVC, in H.266/VVC, CUs 510 can be rectangular or square, and can be coded without further partitioning into prediction units or transform units. For example, as shown in FIG. 5D, the partition of CTU 508 into CUs 510 may include quadtree splitting (indicated in solid lines), binary tree splitting (indicated in dashed lines), and ternary splitting (indicated in dash-dotted lines). Each CU 510 can be as large as its root CTU 508 or be subdivisions of root CTU 508 as small as 4×4 blocks, according to some embodiments. As described below in detail, by dividing video 500 into multiple pieces at different levels (e.g., sequences 502, pictures 504, slices 506, CTUs 508, CU 510, etc.), syntax elements may be used at different levels when coding video 500 to increase the flexibility and efficiency of video coding.

Referring to FIG. 3, inter prediction module 304 may be configured to perform inter prediction on a prediction unit, and intra prediction module 306 may be configured to perform intra prediction on the prediction unit. It may be determined whether to use inter prediction or to perform intra prediction for the prediction unit, and determine specific information (e.g., intra prediction mode, motion vector, reference picture, etc.) according to each prediction method. At this point, a processing unit for performing prediction may be different from a processing unit for determining a prediction method and specific content. For example, a prediction method and a prediction mode may be determined in a prediction unit, and prediction may be performed in a transform unit. Residual coefficients in a residual block between the generated prediction block and the original block may be input into transform module 308. In addition, prediction mode information, motion vector information, and the like used for prediction may be encoded by encoding module 320 together with the residual coefficients or quantization levels into the bitstream. It is understood that in certain encoding modes, an original block may be encoded as it is without generating a prediction block through prediction module 304 or 306. It is also understood that in certain encoding modes, prediction, transform, and/or quantization may be skipped as well.

In some embodiments, inter prediction module 304 may predict a prediction unit based on information on at least one picture among pictures before or after the current picture, and in some cases, it may predict a prediction unit based on information on a partial area that has been encoded in the current picture. Inter prediction module 304 may include sub-modules, such as a reference picture interpolation module, a motion prediction module, and a motion compensation module (not shown). For example, the reference picture interpolation module may receive reference picture information from buffer module 318 and generate pixel information of an integer number of pixels or less from the reference picture. In the case of a luminance pixel, a discrete cosine transform (DCT)-based 8-tap interpolation filter with a varying filter coefficient may be used to generate pixel information of an integer number of pixels or less by the unit of ¼ pixels. In the case of a color difference signal, a DCT-based 4-tap interpolation filter with a varying filter coefficient may be used to generate pixel information of an integer number of pixels or less by the unit of ⅛ pixels. The motion prediction module may perform motion prediction based on the reference picture interpolated by the reference picture interpolation part. Various methods such as a full search-based block matching algorithm (FBMA), a three-step search (TSS), and a new three-step search algorithm (NTS) may be used as a method of calculating a motion vector. The motion vector may have a motion vector value of a unit of ½, ¼, or 1/16 pixels or integer pel based on interpolated pixels. The motion prediction module may predict a current prediction unit by varying the motion prediction method. Various methods such as a skip method, a merge method, an advanced motion vector prediction (AMVP) method, an intra-block copy method, and the like may be used as the motion prediction method.

In some embodiments, intra prediction module 306 may generate a prediction unit based on the information on reference pixels around the current block, which is pixel information in the current picture. When a block in the neighborhood of the current prediction unit is a block on which inter prediction has been performed and thus, the reference pixel is a pixel on which inter prediction has been performed, the reference pixel included in the block on which inter prediction has been performed may be used in place of reference pixel information of a block in the neighborhood on which intra prediction has been performed. That is, when a reference pixel is unavailable, at least one reference pixel among available reference pixels may be used in place of unavailable reference pixel information. In the intra prediction, the prediction mode may have an angular prediction mode that uses reference pixel information according to a prediction direction, and a non-angular prediction mode that does not use directional information when performing prediction. A mode for predicting luminance information may be different from a mode for predicting color difference information, and intra prediction mode information used to predict luminance information or predicted luminance signal information may be used to predict the color difference information. If the size of the prediction unit is the same as the size of the transform unit when intra prediction is performed, the intra prediction may be performed for the prediction unit based on pixels on the left side, pixels on the top-left side, and pixels on the top of the prediction unit. However, if the size of the prediction unit is different from the size of the transform unit when the intra prediction is performed, the intra prediction may be performed using a reference pixel based on the transform unit.

The intra prediction method may generate a prediction block after applying an adaptive intra smoothing (AIS) filter to the reference pixel according to a prediction mode. The type of the AIS filter applied to the reference pixel may vary. In order to perform the intra prediction method, the intra prediction mode of the current prediction unit may be predicted from the intra prediction mode of the prediction unit existing in the neighborhood of the current prediction unit. When a prediction mode of the current prediction unit is predicted using the mode information predicted from the neighboring prediction unit, if the intra prediction modes of the current prediction unit are the same as the prediction unit in the neighborhood, information indicating that the prediction modes of the current prediction unit are the same as the prediction unit in the neighborhood may be transmitted using predetermined flag information, and if the prediction modes of the current prediction unit and the prediction unit in the neighborhood are different from each other, prediction mode information of the current block may be encoded by extra flags information.

As shown in FIG. 3, a residual block including a prediction unit that has performed prediction based on the prediction unit generated by prediction module 304 or 306 and residual coefficient information, which is a difference value of the prediction unit with the original block, may be generated. The generated residual block may be input into transform module 308.

Transform module 308 may be configured to transform the residual block including the original block and the residual coefficient information of the prediction unit generated through prediction modules 304 and 306 using a transform method, such as DCT, discrete sine transform (DST), Karhunen—Loève transform (KLT), or transform skip. Whether to apply the DCT, the DST, or the KLT to transform the residual block may be determined based on intra prediction mode information of a prediction unit used to generate the residual block. Transform module 308 can transform the video signals in the residual block from the pixel domain to a transform domain (e.g., a frequency domain depending on the transform method). It is understood that in some examples, transform module 308 may be skipped, and the video signals may not be transformed to the transform domain.

Quantization module 310 may be configured to quantize the coefficient of each position in the coding block to generate quantization levels of the positions. The current block may be the residual block. That is, quantization module 310 can perform a quantization process on each residual block. The residual block may include N×M positions (samples) each associated with a transformed or non-transformed video signal/data, such as luma and/or chroma information, where N and M are positive integers. In the present disclosure, before quantization, the transformed or non-transformed video signal at a specific position is referred to herein as a "coefficient." After quantization, the quantized value of the coefficient is referred to herein as a "quantization level" or "level."

Quantization can be used to reduce the dynamic range of transformed or non-transformed video signals so that fewer bits will be used to represent video signals. Quantization typically involves division by a quantization step size and subsequent rounding, while dequantization (a.k.a., inverse quantization) involves multiplication by the quantization step size. The quantization step size can be indicated by a quantization parameter (QP). Such a quantization process is referred to as scalar quantization. The quantization of all coefficients within a coding block can be done independently, and this kind of quantization method is used in some existing video compression standards, such as H.264/AVC and H.265/HEVC. The QP in quantization can affect the bit rate used for video coding. For example, a higher QP can result in a lower bit rate, and a lower QP can result in a higher bit rate.

For an N×M coding block, a specific coding scan order may be used to convert the two-dimensional (2D) coefficients of a block into a one-dimensional (1D) order for coefficient quantization and coding. Typically, the coding scan starts from the left-top corner and stops at the right-bottom corner of a coding block or the last non-zero coefficient/level in a right-bottom direction. It is understood that the coding scan order may include any suitable order, such as a zig-zag scan order, a vertical (column) scan order, a horizontal (row) scan order, a diagonal scan order, or any combinations thereof. Quantization of a coefficient within a coding block may make use of the coding scan order information. For example, it may depend on the status of the previous quantization level along the coding scan order. In order to further improve the coding efficiency, more than one quantizer, e.g., two scalar quantizers, can be used by quantization module 310. Which quantizer will be used for quantizing the current coefficient may depend on the information preceding the current coefficient in coding scan order. Such a quantization process is referred to as dependent quantization.

Referring to FIG. 3, encoding module 320 may be configured to encode the quantization level of each position in the coding block into the bitstream. In some embodiments, encoding module 320 may perform entropy encoding on the coding block. Entropy encoding may use various binarization methods, such as Golomb-Rice binarization, including, for example, EGk binarization and combined TR and limited EGk binarization, to convert each quantization level into a respective binary representation, such as binary bins. Then, the binary representation can be further compressed using entropy encoding algorithms, such as VLC, CAVLC, CABAC, SBAC, PIPE coding, and the like. The compressed data may be added to the bitstream. In some embodiments, encoding module 320 may perform residual coding on a coding block to convert the quantization level into the bitstream. For example, after quantization, there may be N×M quantization levels for an N×M block. These N×M levels may be zero or non-zero values. The non-zero levels may be further binarized to binary bins if the levels are not binary, for example, using combined TR and limited EGk binarization.

Besides the quantization levels, encoding module 320 may encode various other information, such as block type information of a coding unit, prediction mode information, partitioning unit information, prediction unit information, transmission unit information, motion vector information, reference frame information, block interpolation information, and filtering information input from, for example, prediction modules 304 and 306. The information other than the quantization levels or the coefficients, such as the parameters used in video coding, may be organized and included in the headers at different levels, such as the header of sequence 502, the header of picture 504, the header of slice 506, the header of CTU 508, the header of CU 510, etc.

For example, the header of each sequence 502 may include sequence-level syntax elements (e.g., flags) each having a value applied to all pictures 504 in the respective sequence 502, and the header of each slice 506 may further include slice-level syntax elements (e.g., flags) each having a value applied to all CTUs 508 in the respective slice 506.

Figure 6:
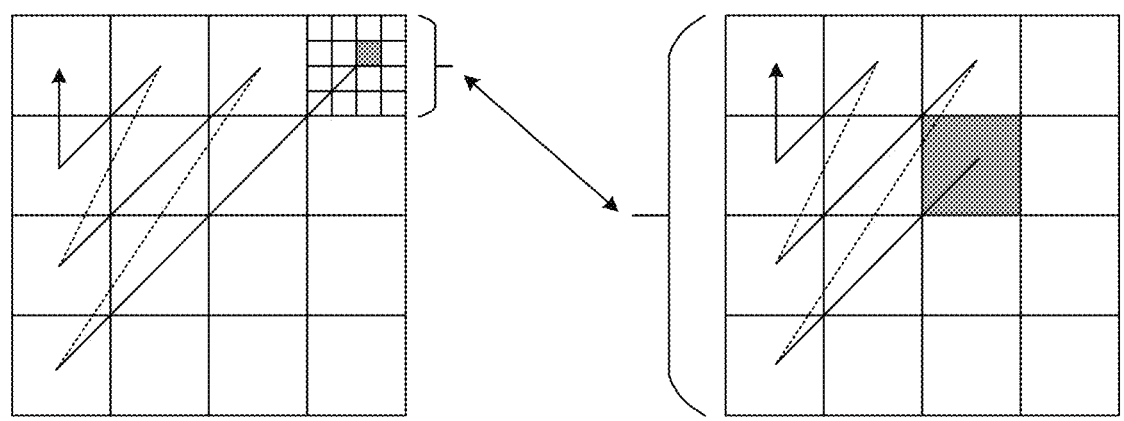
FIG. 6 illustrates an exemplary transform block encoded using regular residual coding (RRC), according to some embodiments of the present disclosure.

Consistent with the scope of the present disclosure, in H.266/VVC, since some parameters for video coding are considered to be optional, e.g., not always applicable to each sequence 502, those parameters may be referred to as a set of header extension parameters, which can be defined or parsed at the end of a header at a suitable level based on whether those parameters are present at that level. For example, the set of header extension parameters may include slice-level syntax elements as described below in detail for illustrative purposes only, including (i) a last significant coefficient reverse flag indicative of a reference position for referencing a position of the last significant coefficient, (ii) a high throughput mode flag indicative of whether the slice is encoded in the high throughput mode, (iii) a residual data bit shift flag indicative of whether residual data bit shifts in residual coding of the slice, and (iv) a luma/chroma shift syntax element indicative of the number of shifted bits in luma/chroma residual coding of the slice. According to some aspects of the present disclosure, in H.266/VVC, the coding block is a transform block encoded using regular residual coding (RRC). Transform blocks larger than 4×4 may be divided into disjunct 4×4 subblocks, which are processed using a reverse diagonal scan pattern. It is understood that H.266/VVC supports non-4×4 subblocks due to the support of non-square rectangular shape of transform blocks. For ease of description and without loss of generality, FIG. 6 depicts an example of a 16×16 transform block, where this transform block is further partitioned into 4×4 subblocks. The reverse diagonal scan pattern is used for processing the subblocks of a transform block as well as for processing the frequency positions within each subblock.

In RRC, the position of the last non-zero level (a.k.a., the last significant scan position) may be defined as the position of the last non-zero level along the coding scan order. The 2D coordinates (last_sig_coeff_x and last_sig_coeff_y) of the last non-zero level may be first coded with up to four syntax elements, i.e., two context-coded syntax elements—two last significant coefficient prefixes (last_sig_coeff_x_prefix and last_sig_coeff_y_prefix), and two bypass-coded syntax elements—two last significant coefficient suffixes (last_sig_coeff_x_suffix and last_sig_coeff_x_suffix). Within a subblock, RRC may first code a context-coded bin—a coded subblock flag (sb_coded_flag) to indicate whether the current subblock has all the levels equal to zero or not. For example, if sb_coded_flag is equal to 1, there may be at least one non-zero coefficient in the current subblock; if sb_coded_flag is equal to 0, all the coefficients in the current subblock will be zeros. It is understood that the sb_coded_flag for the last non-zero subblock, which has the last non-zero level may be derived from last_sig_coeff_x and last_sig_coeff_y according to the coding scan order without coding into the bitstream. Similarly, the sb_coded_flag for the first subblock, where the DC for the entire block resides, may be derived according to the coding scan order without coding into the bitstream. Other sb_coded_flag may be coded as context-coded bins. RRC may code subblock by subblock starting from the last non-zero subblock with a reverse coding scan order.

In some embodiments, the coordinates of the last significant scan position/coefficient are measured in reference to the top-left corner (0, 0). For high/bitrate (e.g., 16 bits or above) with high bit-depth video coding (e.g., in the high throughput mode of video coding), the transform coefficients distribute much more broadly in a transform block. As a result, the last significant coefficient scan position/coefficient tends to be closer to the bottom-right corner rather than the top-left corner. Thus, in some embodiments, a set of alternative coordinates of the last significant coefficient are measured and coded in reference to the bottom-right corner of the transform block. The actual coordinates may be calculated by subtracting the alternative coordinates from the width minus 1 or height minus 1. In some embodiments, a zero-out process may be applied to the transform block in coding the actual coordinates. For example, the coordinates may be coded relative to (Log 2ZoTbWidth<<1)−1, (Log 2ZoTbHeight<<1)−1, where (Log 2ZoTbWidth<<1) and (Log 2ZoTbHeight<<1) refer to the width and height of the zero-out area within a transform block where zero-out area is defined as sub-area within a transform block and all coefficients outside zero-out area are zeros, respectively.

Consistent with the scope of the present disclosure, a sequence-level flag (sps_reverse_last_sig_coeff_enabled_flag) is provided, for example, in the header extension of a specific sequence to indicate whether slice-level flags (sh_reverse_last_sig_coeff_flag) are enabled for slices in this sequence. The slice-level flag (sh_reverse_last_sig_coeff_flag) may be a last significant coefficient reverse flag indicative of a reference position for referencing a position of the last significant coefficient in a slice, and the sequence-level flag (sps_reverse_last_sig_coeff_enabled_flag) may be a flag indicative of the enablement/disablement of the usage of the last significant coefficient reverse flag in the corresponding sequence. The corresponding slice-level flag (sh_reverse_last_sig_coeff_flag) is then provided, for example, in the header of each slice in the sequence, and its value indicates the reference position (e.g., the top-left corner or the bottom-right corner) for referencing the position of the last significant coefficient, i.e., the usage of alternative coordinates or not for the last significant coefficient in the corresponding slice. For example, if sps_reverse_last_sig_coeff_enabled_flag in the sequence header extension is equal to 1, the usage of the alternative coordinates may be further signaled by sh_reverse_last_sig_coeff_flag in the slice header for each slice in the sequence. When sh_reverse_last_sig_coeff_flag is equal to 1, the last significant coefficient may be coded by using the alternative coordinates for the corresponding slice. Otherwise, the regular coordinates for the last significant coefficient may be used for the corresponding slice. If sps_reverse_last_sig_coeff_enabled_flag in the sequence header extension is equal to 0, the regular coordinates for the last significant coefficient may be used for all the slices in the sequence without the need for further signaling at the slice level using sh_reverse_last_sig_coeff_flag. The examples below illustrate sps_reverse_last_sig_coeff_enabled_flag in the sequence header extension and sh_reverse_last_sig_coeff_flag in the slice header.

| | Descriptor |
|---|---|
| sps_range_extension( ) { | |
| ... | u(1) |
| sps_reverse_last_sig_coeff_enabled_flag | u(1) |
| slice_header( ) { | Descriptor |
| ... | |
| if(sps_reverse_last_sig_coeff_enabled_flag ) | |
| sh_reverse_last_sig_coeff_flag | u(1) |
| ... | |

According to some aspects of the present disclosure, context-adaptive modeling based binary arithmetic coding (CABAC) for H.266/VVC, H.265/HEVC, and H.264/AVC use bins to code quantization levels of positions into bits. There are two kinds of context modeling-based coding approaches used by CABAC. The context-based approach updates the context model adaptively according to the neighboring coded information; bins coded in this way are called context-coded bins (CCBs). In contrast, the other bypass approach assumes the probability of 1 or 0 is always 50% and therefore always uses a fixed context modeling without adaptation; bins coded by this approach are called bypass-coded bins (BCBs). For high bit-depth and high bit-rate video coding, the throughput becomes a more serious issue. The coding using context-coded bins, however, requires relatively complex hardware implementations and reduces the throughput of video coding in general, compared with coding bypass-coded bins and thus, has become a bottleneck for improving the throughput of high bit-depth and high bit-rate video coding.

To improve the throughput of video coding, in particular, high bit-depth and high bit-rate video coding, a high throughput mode can be enabled during residual coding as needed, for example, for applications requiring high bit-depth and high bit-rate video coding to obtain a better throughput. In some embodiments, some or all of the context-coded bins for residual coding can be changed to bypass-coded bins in the high throughput mode. In some embodiments, some or all of the context-coded bins for residual coding can be skipped in the high throughput mode. As a result, only bypass-coded bins may be used for residual coding in the high throughput mode. Moreover, bypass bit-alignment can be applied in the high throughput mode to further improve the throughput of bypass coding because the bypass coding can be implemented with a shift operation instead of going through regular CABAC operations after the application of the bit-alignment, which can enable simultaneously coding using multiple bypass-coded bins. Bypass bit-alignment can be invoked at different stages of residual coding as needed in the high throughput mode, such as the beginning of the coding process of the current coding block, the beginning of the coding process of the transform unit, etc.

In order to guarantee the worst-case throughput, a value of remaining context-coded bins (remBinsPass1) may be used to limit the maximum number of context-coded bins. The initial value of remBinsPass1 may be calculated based, at least in part, on the length and width of the coding block. Within a subblock, RRC may code the level of each position with a reverse coding scan order. A predefined threshold may be compared with remBinsPass1 to determine whether the maximum number of context-coded bins has been reached. For example, the threshold of remBinsPass1 in H.266/VVC may be predefined to be 4.

Figure 7:
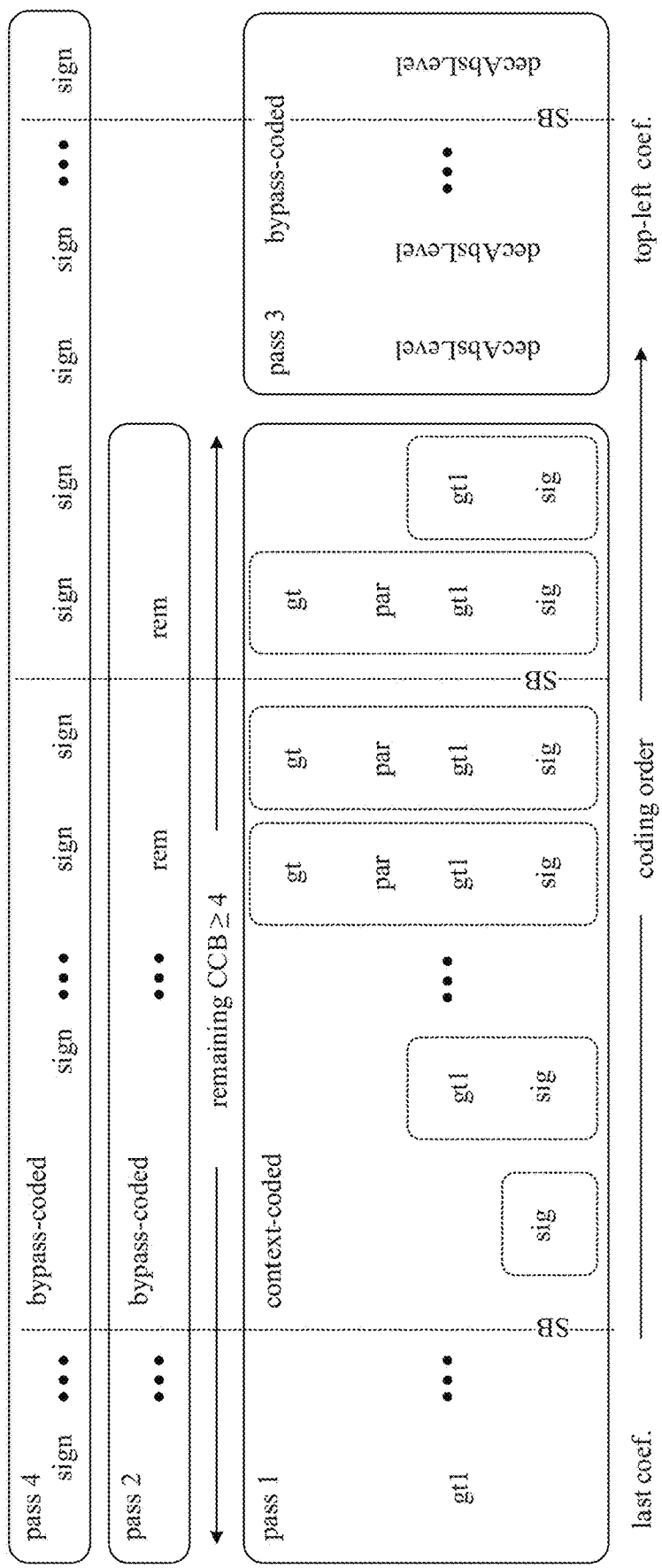
FIG. 7 illustrates coding passes in RRC.

As shown in FIG. 7, if remBinsPass1 is not smaller than 4 ("remaining CCB≥4" in FIG. 7), when encoding the quantization level of each position of a subblock ("SB" in FIG. 7), a significance flag (sig_coeff_flag, "sig" in FIG. 7) may be first coded into the bitstream to indicate if the level is zero or non-zero. If the level is non-zero, a greater than 1 flag (abs_level_gtx_flag[n][0] where n is the index along scan order of current position within the subblock, "gt1" in FIG. 7) may then be coded into the bitstream to indicate if the absolute level is 1 or greater than 1. If the absolute level is greater than 1, a parity flag (par_level_flag, "par" in FIG. 7) may then be coded into the bitstream to indicate if the level is an odd or even number, and then a greater than flag (abs_level_gtx_flag[n][1], "gt" in FIG. 7) may be present. The flags of par_level_flag and abs_level_gtx_flag[n][1] may also be used together to indicate the level is 2, 3, or greater than 3. After coding each above syntax element with the context coding method, i.e., context-coded bins, the value of remBinsPass1 may be decreased by 1. In other words, the significance flag, greater than 1 flag, parity flag, and greater than flag may be coded as context-coded bins for each position of each subblock in the first coding pass ("pass 1" in FIG. 7).

If the absolute level is greater than 5 or the value of remBinsPass1 is smaller than 4, two more syntax elements, a reminder (abs_remainder, "rem" in FIG. 7, also referred to as "remaining level" in the present disclosure), and an absolute level (dec_abs_level, "decAbsLevel" in FIG. 7) may be coded as bypass-coded bins in the second coding pass ("pass 2" in FIG. 7) and the third coding pass ("pass 3" in FIG. 7), respectively, for the remaining level after coding the aforementioned context-coded bins. In addition, a coefficient sign flag of each non-zero level (coeff_sign_flag, "sign" in FIG. 7) may also be coded in the fourth coding pass ("pass 4" in FIG. 7) as a bypass-coded bin to fully represent the quantization level.

In some embodiments, a more general residual coding method uses level greater than flags (abs_level_gtxX_flag) and a remaining level bin to allow conditionally parsing the syntax elements for level coding of a transform block, and its corresponding binarization of absolute value of level is shown in TABLE I below. Here abs_level_gtxX_flag describes if the absolute value of level is greater than X, where X is an integer number, e.g., 0, 1, 2, . . . or N. If abs_level_gtxX_flag is 0, where X is an integer between 0 and N−1, abs_level_gtx(X+1)_flag will not be present. If abs_level_gtxX_flag is 1, abs_level_gtx(X+1)_flag will be present. Moreover, if abs_level_gtxN_flag is 0, the remainder will not be present. When abs_level_gtxN_flag is 1, the remainder will be present, and it represents the value after removing (N+1) from the level. Typically, abs_level_gtxX_flag may be coded as context-coded bins, and the remaining level bin is coded as a bypass-coded bin.

TABLE I

Residual Coding Based On abs_level_gtxX_flag Bins and Remainder Bin

| abs(lvl) | 0 | 1 | 2 | 3 | 4 | 5 | 6 | 7 | 8 | 9 | ... |
|---|---|---|---|---|---|---|---|---|---|---|---|
| abs_level_gtx0_flag | 0 | 1 | 1 | 1 | 1 | 1 | 1 | 1 | 1 | 1 | ... |
| abs_level_gtx1_flag |   | 0 | 1 | 1 | 1 | 1 | 1 | 1 | 1 | 1 | ... |
| abs_level_gtx2_flag |   |   | 0 | 1 | 1 | 1 | 1 | 1 | 1 | 1 | ... |
| abs_level_gtx3_flag |   |   |   | 0 | 1 | 1 | 1 | 1 | 1 | 1 | ... |
| abs_remainder |   |   |   |   | 0 | 1 | 2 | 3 | 4 | 5 | ... |

Figure 8A:
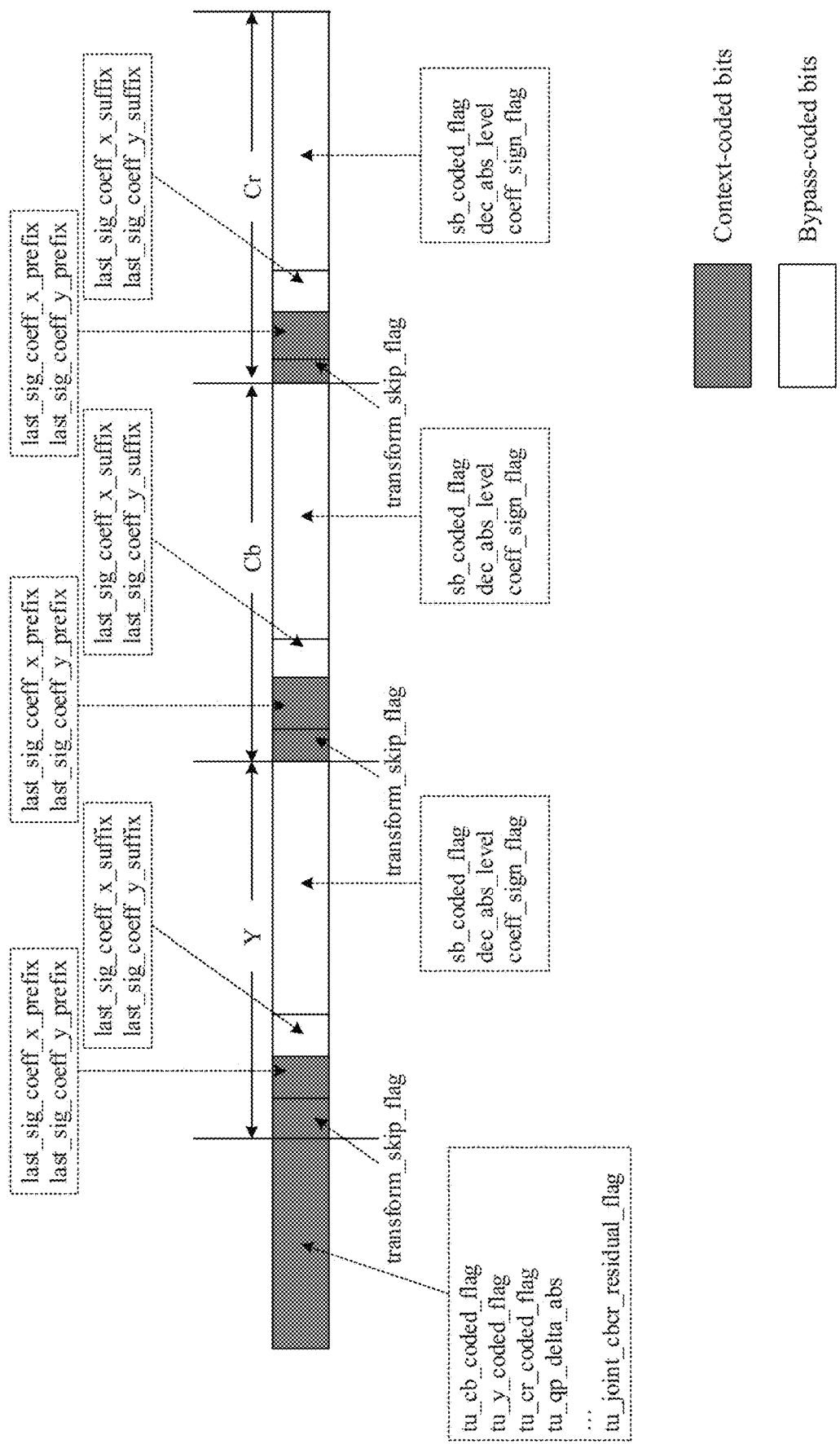
FIG. 8A illustrates an exemplary high throughput mode in RRC, according to some embodiments of the present disclosure.

FIG. 8A illustrates an exemplary high throughput mode in RRC, according to some embodiments of the present disclosure. As shown in FIG. 8A, the bitstream may start from transform unit bins of a transform unit. Various transform unit bins may remain as context-coded bins for context coding in CABAC. The transform unit bins may include a coded Cb trans form block flag (tu_cb_coded_flag), a coded Cr transform block flag (tu_cr_coded_flag), a coded luma transform block flag (tu_y_coded_flag), a quantization parameter delta value (cu_qp_delta_abs), a chroma quantization parameter offset flag (cu_chroma_qp_offset_flag), a chroma quantization parameter offset index (cu_chroma_qp_offset_idx), a joint chroma flag (tu_joint_cbcr_residual_flag), and transform skip flags (transform_skip_flag).

It is understood that transform unit bins may also include a bypass-coded bin, such as a quantization parameter delta sign flag (cu_qp_delta_sign_flag) in some examples.

As shown in FIG. 8A, the transform unit may correspond to one coding block (e.g., transform block for RRC) of luma samples ("Y" in FIG. 8A) and two corresponding coding blocks of chroma samples ("Cb" and "Cr" in FIG. 8A). Transform unit bins thus may include three transform skip flags for Y, Cb, and Cr coding blocks, respectively, each of which is a context-coded bin. For each coding block, the first residual coding bin of the coding block that is to be encoded/decoded in the bitstream after transform_skip_flag may be the last significant coefficient prefixes (last_sig_coeff_x_prefix and last_sig_coeff_y_prefix), which remain as context-coded bins. All other residual coding bins in each coding block may be bypass-coded bins, as shown in FIG. 8A. For example, the bypass-coded residual coding bins may include the last significant coefficient suffixes (last_sig_coeff_x_suffix and last_sig_coeff_y_suffix), the coded subblock flag (sb_coded_flag), the absolute level (dec_abs_level), and the coefficient sign flag (coeff_sign_flag).

That is, the high throughput mode may be enabled for each coding block after last_sig_coeff_x_prefix and last_sig_coeffy_prefix and before sb_coded_flag. In some embodiments in which last_sig_coeff_x_sufix and last_sig_coeff_y_sufix also need to be coded, the high throughput mode may be enabled for each coding block after last_sig_coeff_x_prefix and last_sig_coeff_y_prefix and before last_sig_coeff_x_sufix and last_sig_coeff_y_sufix. In other words, the high throughput mode may be enabled for each coding block right after last_sig_coeff_x_prefix and last_sig_coeff_y_prefix. The residual coding bin—sb_coded_flag may be changed from a context-coded bin to a bypass-coded bin for each position of each subblock in the high throughput mode. The coding of all other context-coded bins, such as the significance flag (sig_coeff_flag), greater than 1 flag (abs_level_gtx_flag[n][0]), parity flag (par_level_flag), and greater than flag (abs_level_gtx_flag[n][1]), may be skipped, for example, by setting the value of remaining context-coded bins (remBinsPass1) to be less than the threshold 4, e.g., to be 0. The coding of the remaining level/reminder (abs_remainder[n]) may thus be skipped as well. In other words, in the high throughput mode, the first and second coding passes of each position of each subblock of a coding block may be skipped, such that the context-coded bins may not occur in the first coding pass. As a result, each coding block may be coded using only bypass-coded bins except for last_sig_coeff_x_prefix and last_sig_coeff_y_prefix in the high throughput mode. The coding of each quantization level may be done by the bypass-coded absolute level (dec_abs_level), as opposed to the remaining level/reminder (abs_remainder).

Figure 8B:
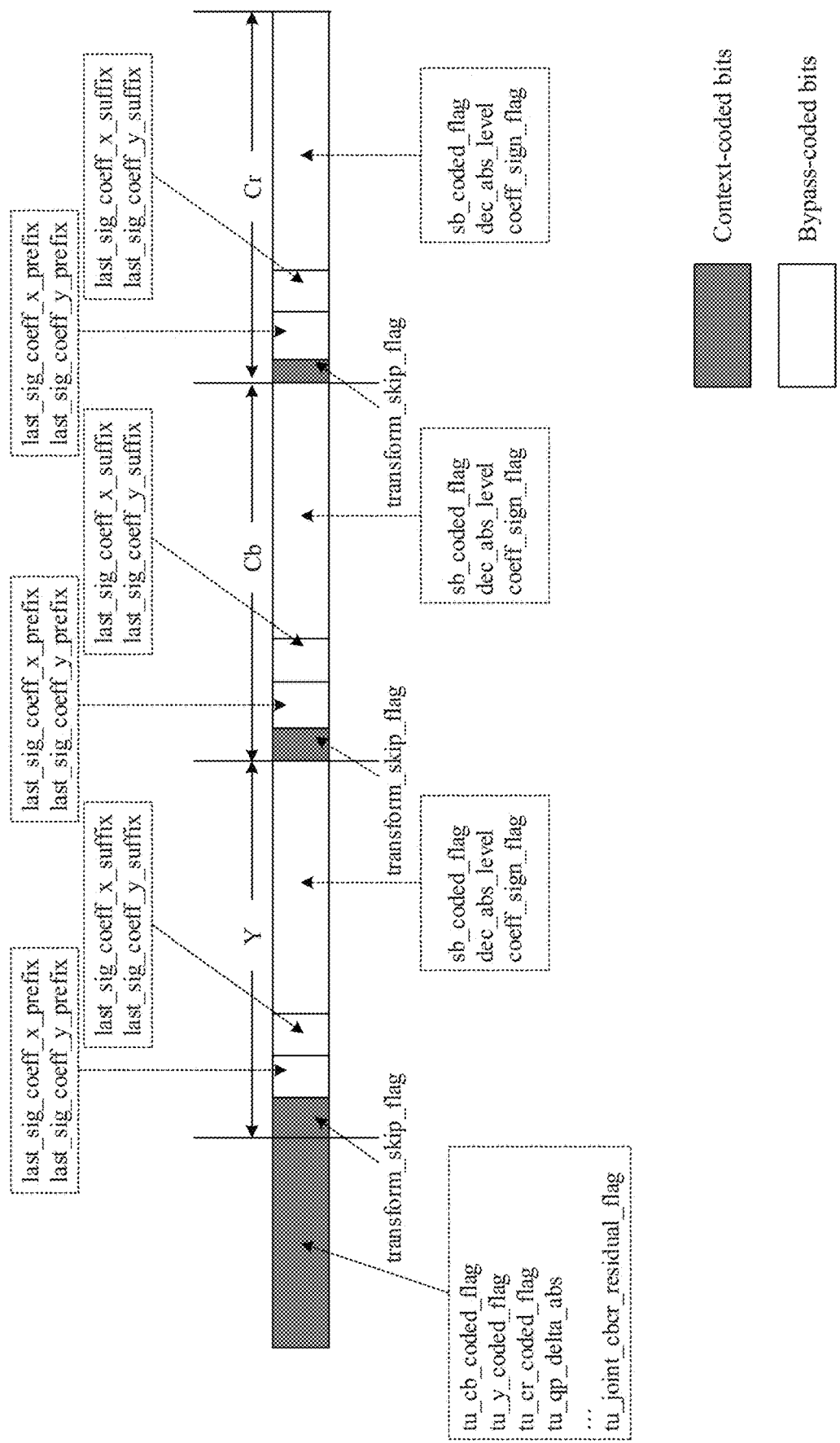
FIG. 8B illustrates another exemplary high throughput mode in RRC, according to some embodiments of the present disclosure.

FIG. 8B illustrates another exemplary high throughput mode in RRC, according to some embodiments of the present disclosure. Different from the bypass coding in FIG. 8A, the high throughput mode of FIG. 8B further changes last_sig_coeff_x_prefix and last_sig_coeff_y_prefix from context-coded bins to bypass-coded bins, such that each coding block may be coded using only bypass-coded bins in the high throughput mode in FIG. 8B. As shown in FIG. 8B, the high throughput mode may be enabled at the coding block level. Compared with the scheme in FIG. 8A, the scheme in FIG. 8B can further improve the throughput of video coding by changing the last significant coefficients prefixes from context-coded bins to bypass-code bins. For a very high bit rate and high bit depth operating range, the bits for the position of the last significant coefficients may also be quite high because most of the blocks are coded as smaller block sizes. The derivation of the context indices of last_sig_coeff_x_prefix and last_sig_coeff_y_prefix may impact the throughput because index of the context variables is derived for each bin of last_sig_coeff_x_prefix and last_sig_coeff_y_prefix.

Figure 8C:
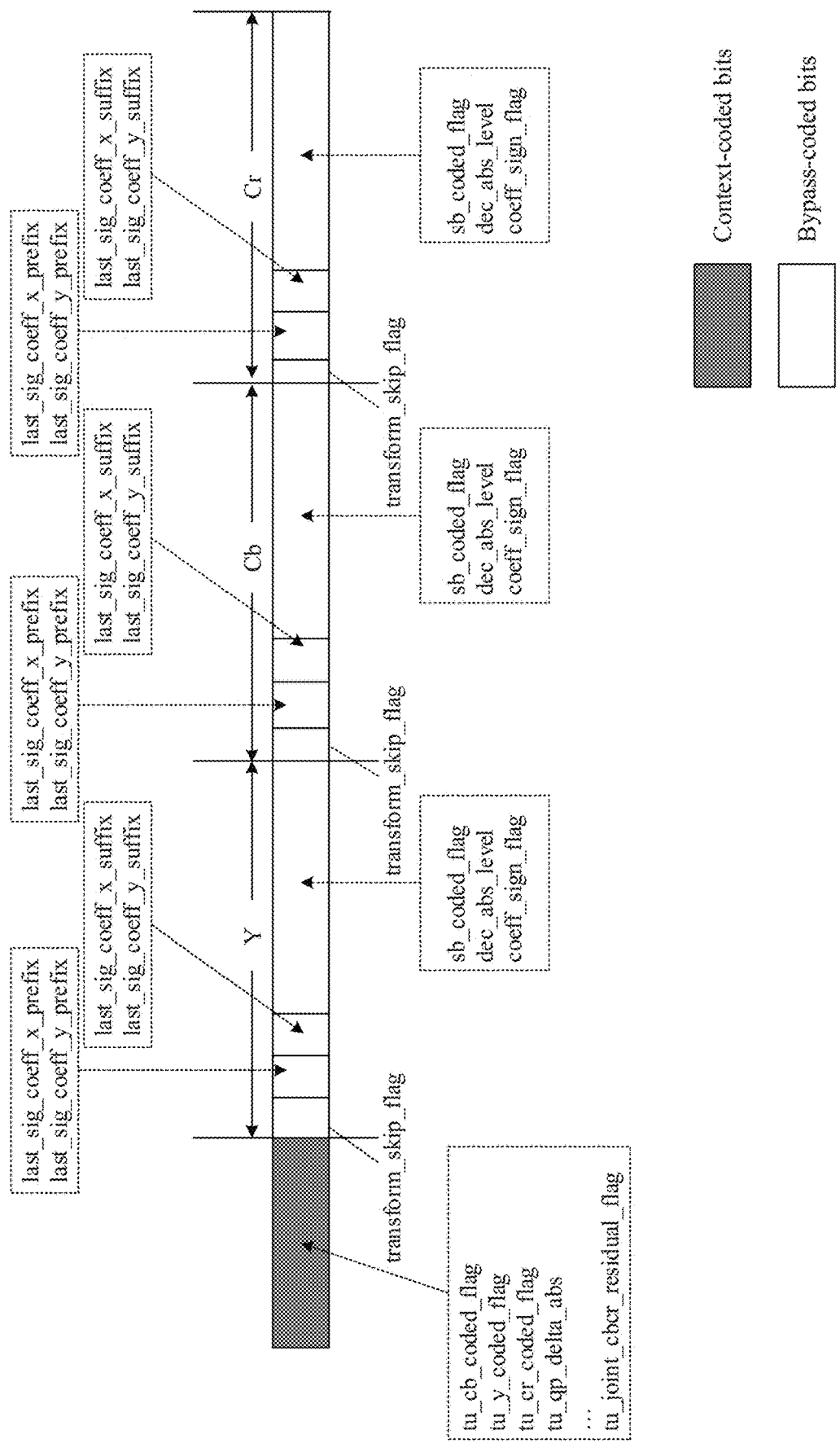
FIG. 8C illustrates still another exemplary high throughput mode in transform unit (TU) coding, according to some embodiments of the present disclosure.

FIG. 8C illustrates still another exemplary high throughput mode in transform unit coding, according to some embodiments of the present disclosure. Different from the high throughput mode in FIG. 8B, the bypass coding mode of FIG. 8C further changes transform_skip_flag from context-coded bin to bypass-coded bin.

Figure 8D:
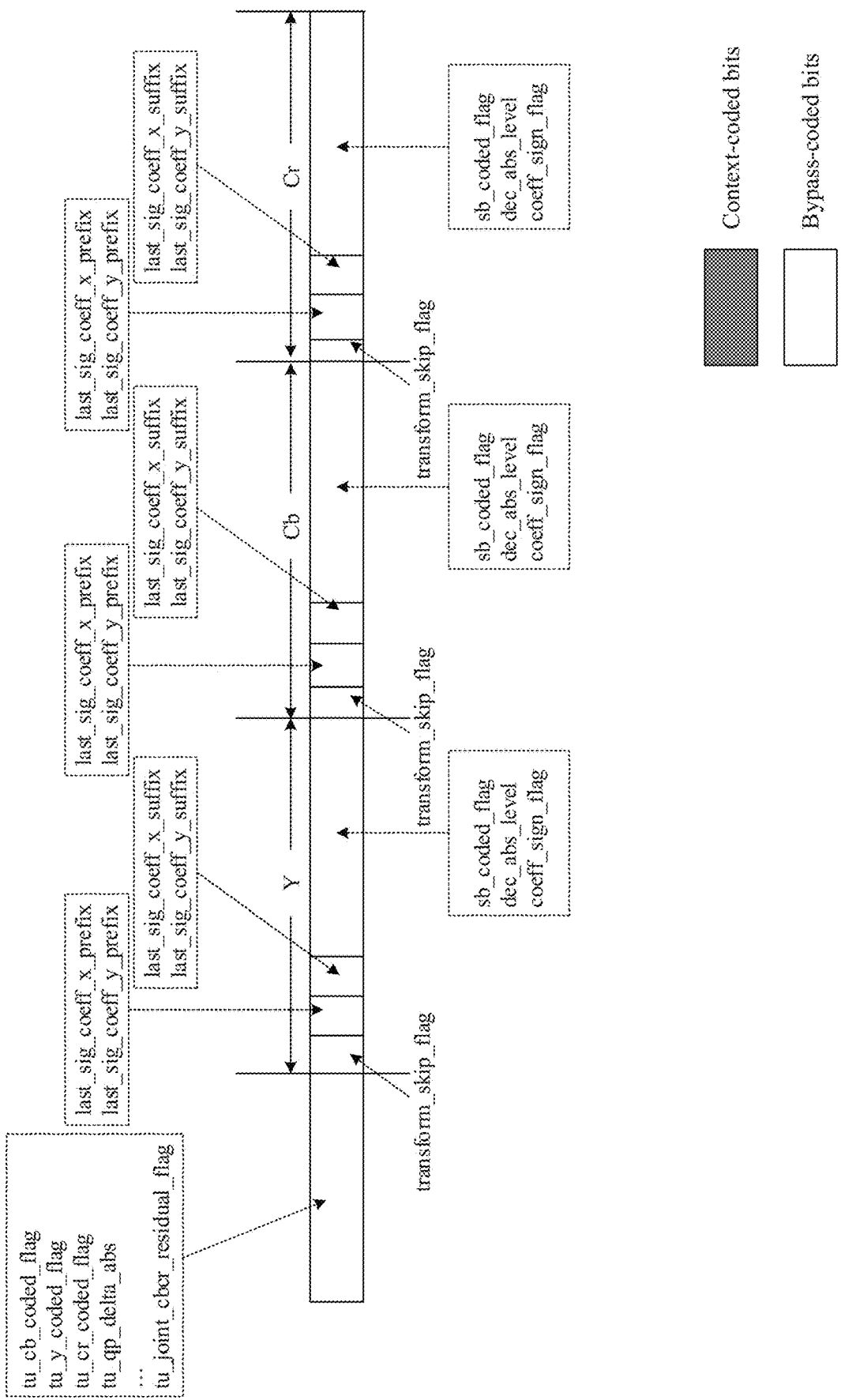
FIG. 8D illustrates an exemplary high throughput mode in TU coding, according to some embodiments of the present disclosure.

FIG. 8D illustrates still another exemplary high throughput mode in transform unit coding, according to some embodiments of the present disclosure. Different from FIG. 8C, the high throughput mode of FIG. 8D further changes transform unit bins of the transform unit from context-coded bins to bypass-code bins, such that all the transform unit bins of the transform unit are coded as bypass-code bins as well in the high throughput mode. For example, in the bypass coding mode, besides transform_skip flags, tu_cb_coded_flag, tu_cr_coded_flag, tu_y_coded_flag, cu_qp_delta_abs, cu_chroma_qp_offset_flag, cu_chroma_qp_offset_idx, and tu_joint_cbcr_residual_flag may be changed from context-coded bins to bypass-coded bins. As a result, the transform unit and three corresponding coding blocks may be coded using only bypass-coded bins in the high throughput mode in FIG. 8D. Compared with the scheme in FIG. 8C, the bypass coding mode in FIG. 8D can further improve the throughput of video coding by coding the transform unit bins as only bypass-coded bins to avoid any switch between context coding and bypass coding by the CABAC coding engine when coding the transform unit. The bypass coding mode may be enabled at the transform unit level.

Consistent with the scope of the present disclosure, another sequence-level flag (sps_high_throughput_mode_enabled_flag) is provided, for example, in the header extension of a specific sequence to indicate whether slice-level flags (sh_high_throughput_mode_flag) are enabled for slices in this sequence. The corresponding slice-level flag (sh_high_throughput_mode_flag) is then provided, for example, in the header of each slice in the sequence, and its value indicates whether the slice is encoded in the high throughput mode. For example, if sps_high_throughput_mode_enabled_flag in the sequence header extension is equal to 1, the usage of the high throughput mode for coding the slice may be further signaled by sh_high_throughput_mode_flag in the slice header for each slice in the sequence. When sh_high_throughput_mode_flag is equal to 1, the slice may be coded in the high throughput mode. Otherwise, the slice may not be coded in the high throughput mode. If sps_high_throughput_mode_enabled_flag in the sequence header extension is equal to 0, the high throughput mode may not be invoked for all the slices in the sequence without the need for further signaling at the slice level using sh_high_throughput_mode_flag. The examples below illustrate sps_high_throughput_mode_enabled_flag in the sequence header extension and sh_high_throughput_mode_flag in the slice header.

| sps_range_extension( ) { | Descriptor |
|---|---|
| ... | |
| sps_high_throughput_mode_enabled_flag | u(1) |
| } | |
| slice_header( ) { | Descriptor |
| ... | |
| if(sps_high_throughput_mode_enabled_flag) | |
| sh_high_throughput_mode_flag | u(1) |
| ... | |

According to some aspects of the present disclosure, a modification to the coding of residual data in which the significance, GT1, and GT2, are shifted left by a number of bits may be used, which can increase the efficiency of coefficient coding as the flags though less efficiently coded in themselves, give more information about the coefficient value. The reduction in the fraction of set bins can also lead to a decrease in the number of coefficients, which require Golomb-Rice coding.

Consistent with the scope of the present disclosure, still another sequence-level flag (sps_shift_residual_data_enabled_flag) is provided, for example, in the header extension of a specific sequence to indicate whether slice-level syntax elements (slice_flagshift_luma and slice_flagshift_chroma) are enabled for slices in this sequence. The slice-level syntax elements (slice_flagshift_luma and slice_flagshift_chroma) may be syntax elements indicative of the numbers of shifted bits of luma/chroma data in residual coding of a slice, and the sequence-level flag (sps_shift_residual_data_enabled_flag) may be a flag indicative of the enablement/disablement of the usage of the slice-level bit-shifting syntax elements in the corresponding sequence. The corresponding slice-level syntax elements (slice_flagshift_luma and slice_flagshift_chroma) are then provided, for example, in the header of each slice in the sequence, and their values indicate the number of shifted bits in luma/chroma residual coding of the slice. For example, if sps_shift_residual_data_enabled_flag in the sequence header extension is equal to 1, the usage of residual data bit shifting for coding the slice may be further signaled by slice_flagshift_luma and slice_flagshift_chroma in the slice header for each slice in the sequence. The values of slice_flagshift_luma and slice_flagshift_chroma may indicate the number of bits shifted for corresponding luma and chroma residual data. If sps_shift_residual_data_enabled_flag in the sequence header extension is equal to 0, the usage of residual data bit shifting may not be invoked for all the slices in the sequence, thus there is no need for further specifying at the slice level using slice_flagshift_luma and slice_flagshift_chroma. The examples below illustrate sps_shift_residual_data_enabled_flag in the sequence header extension and slice_flagshift_luma and slice_flagshift_chroma in the slice header.

| sps_range_extension( ) { | Descriptor |
|---|---|
| ... | u(1) |
| sps_shift_residual_data_enabled_flag | u(1) |
| } | |
| slice header( ) { | Descriptor |
| ... | |
| if(sps_shift_residual_data_enabled_flag) { | |
| slice_flagshift_luma | u(4) |
| slice_flagshift_chroma | u(4) |
| } | |

In some embodiments, another slice-level flag (sh_shift_residual_data_enabled_flag) is added between the sequence-level flag (sps_shift_residual_data_enabled_flag) and the slice-level syntax elements (slice_flagshift_luma and slice_flagshift_chroma) to add another layer of condition check/parsing at the slice level. For example, sps_shift_residual_data_enabled_flag provided in the header extension of a specific sequence may indicate whether a residual data bit shift flag (sh_shift_residual_data_enabled_flag) indicative of whether residual data bit shifts in residual coding of the slice enabled for slices in this sequence. The corresponding slice-level flag (sh_shift_residual_data_enabled_flag) may then be provided, for example, in the header of each slice in the sequence, and their values ("0" or "1") indicate whether residual data bit shifts in residual coding of the slice. For example, if sh_shift_residual_data_enabled_flag in the slice header is equal to 1, the usage of the residual data bit shifting in residual coding of the slice may be further specified by slice_flagshift_luma and slice_flagshift_chroma as described above. Otherwise, the slice may not be coded with residual data bit shifting, and the values of slice_flagshift_luma and slice_flagshift_chroma may not need to be further specified. The examples below illustrate sh_shift_residual_data_enabled_flag, slice_flagshift_luma, and slice_flagshift_chroma in the slice header.

| | Descriptor |
|---|---|
| slice_header( ) { | |
| ... | |
| if(sps_shift_residual_data_enabled_flag) | |
|   sh_shift_residual _data_enabled_flag | u(1) |
|   if(sh_shift_residual_data_enabled_flag) { | |
|     slice_flagshift_luma | u(4) |
|     slice_flagshift_ chroma | u(4) |
|   } | | sps_reverse_last_sig_coeff_enabled_flag, sps_high_throughput_mode_enabled_flag, and sps_shift_residual_data_enabled_flag) are provided, for example, in the header extension of the sequence, and their values indicate whether the corresponding header extension parameters are enabled in the sequence, as described above in detail. For example, if pps_slice_header_extension_present_flag is equal to 1, specific sequence-level flags for header extension parameters (e.g., sps_reverse_last_sig_coeff_enabled_flag, sps_high_throughput_mode_enabled_flag, and sps_shift_residual_data_enabled_flag) may be further parsed from the sequence header. If pps_slice_header_extension_present_flag is equal to 0, header extension parameters are not used, and no specific sequence-level flags for the header extension parameters need to be further parsed for coding the sequence.

According to some aspects of the present disclosure, the syntax elements under the same condition check/parsing may be grouped together to further reduce the complexity and increase the efficiency of video coding. For example, some or all of the syntax elements (e.g., the header extension parameters and their corresponding specific sequence-level flags) may be grouped under the same condition check/parsing by the general flag (pps_slice_header_extensionpresent_flag) as below in the two examples below.

| | Descriptor |
|---|---|
| if( pps_slice_header_extension_present_flag) { | |
|   sh_slice_header_extension_length | ue(v) |
|   if(sps_shift_residual_data_enabled_flag){ | |
|     slice_flagshift_luma | u(4) |
|     slice_flagshift_chroma | u(4) |
|   } | |
|   if(sps_reverse_last_sig_coeff_enabled_flag) | |
|     sh_reverse_last_sig_coeff_flag | u(1) |
|   if(sps_high_throughput_flag ) | |
|     sh_high_throughput_mode_flag | u(1) |
|   while ( more_data_in_slice_header_extension( ) ) | |
|     slice_header_extension_data_bit | u(1) |
| if( pps_slice_header_extension_present_flag) { | Descriptor |
|   sh_slice_header_extension_length | ue(v) |
| if(sps_shift_residual_data_enabled_flag) | |
|   sh_shift_residual_data_enabled_flag | u(1) |
|   if(sh_shift_residual_data_enabled_flag) { | |
|     slice_flagshift_luma | u(4) |
|     slice_flagshift_chroma | u(4) |
|   } | |
|   if(sps_reverse_last_sig_coeff_enabled_flag) | |
|     sh_reverse_last_sig_coeff_flag | u(1) |
|   if(sps_high_throughput_flag) | |
|     sh_high_throughput_mode_flag | u(1) |
|   while ( more_data_in_slice_header_extension( ) ) | |
|     slice_header_extension_data_bit | u(1) |

As described above, the last significant coefficient reverse flag, the high throughput mode flag, the residual data bit shift flag, and the luma/chroma shift flag described above are examples of syntax elements that can be specified at the slice level by their values and enabled/disabled at the sequence level by corresponding sequence-level enable flags. Those examples of syntax elements, along with any other suitable syntax elements, may be parts of the parameters that belong to the set of header extension parameters at any suitable level. Consistent with the scope of the present disclosure, a PPS flag (pps_slice_header_extension_present_flag) is provided, for example, in the header of any suitable level to indicate whether a set of header extension parameters are present at that level. Specific sequence-level flags (e.g., In some embodiments, in order to reduce the design complexity, the slice-level syntax elements of header extension parameters may be conditionally parsed in the slice header extension. For example, if the total bits consumed by several slice-level syntax elements of header extension parameters are multiple bytes, those syntax elements may be present at the byte boundary. In one example, if there are 5 syntax elements of header extension parameters for slice-level extension, 3 syntax elements consume one bit per element, and 2 syntax elements consume 4 bits per element, two 8-bit (byte) syntaxes together may be used to represent those 5 syntax elements, and this byte may be put at byte alignment boundary so that extra bits can be avoided to align the byte. As shown in the example above, more_data_in_ slice_header_extension( ) may be used as the condition for specifying slice_header_extension_data_bit, which may be any value. For example, if the current position in the slice header minus the position immediately following slice_header_extension_length is less than (slice_header_extension_length×8), the return value of more_data_in_slice_header_extension( ) is equal to TRUE, which triggers slice_header_extension_data_bit. Otherwise, the return value of more_data_in_slice_header_extension( ) is equal to FALSE.

Referring back to FIG. 3 dequantization module 312 may be configured to dequantize the quantization levels by dequantization module 312, and inverse transform module 314 may be configured to inversely transform the coefficients transformed by transform module 308. The reconstructed residual block generated by dequantization module 312 and inverse transform module 314 may be combined with the prediction units predicted through prediction module 304 or 306 to generate a reconstructed block.

Filter module 316 may include at least one among a deblocking filter, a sample adaptive offset (SAO), and an adaptive loop filter (ALF). The deblocking filter may remove block distortion generated by the boundary between blocks in the reconstructed picture. The SAO module may correct an offset to the original video by the unit of pixel for a video on which the deblocking has been performed. ALF may be performed based on a value obtained by comparing the reconstructed and filtered video and the original video. Buffer module 318 may be configured to store the reconstructed block or picture calculated through filter module 316, and the reconstructed and stored block or picture may be provided to inter prediction module 304 when inter prediction is performed.

Figure 4:
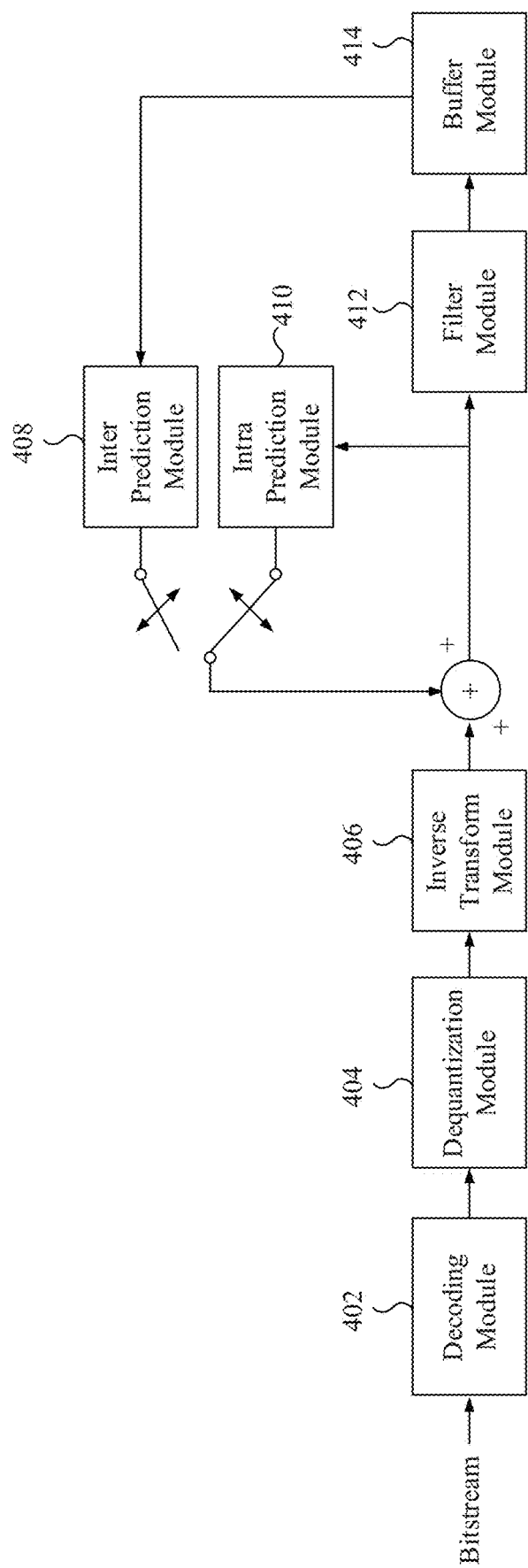
FIG. 4 illustrates a detailed block diagram of an exemplary decoder in the decoding system in FIG. 2, according to some embodiments of the present disclosure.

FIG. 4 illustrates a detailed block diagram of exemplary decoder 201 in decoding system 200 in FIG. 2, according to some embodiments of the present disclosure. As shown in FIG. 4, decoder 201 may include a decoding module 402, a dequantization module 404, an inverse transform module 406, an inter prediction module 408, an intra prediction module 410, a filter module 412, and a buffer module 414. It is understood that each of the elements shown in FIG. 4 is independently shown to represent characteristic functions different from each other in a video decoder, and it does not mean that each component is formed by the configuration unit of separate hardware or single software. That is, each element is included to be listed as an element for convenience of explanation, and at least two of the elements may be combined to form a single element, or one element may be divided into a plurality of elements to perform a function. It is also understood that some of the elements are not necessary elements that perform functions described in the present disclosure but instead may be optional elements for improving performance. It is further understood that these elements may be implemented using electronic hardware, firmware, computer software, or any combination thereof. Whether such elements are implemented as hardware, firmware, or software depends upon the particular application and design constraints imposed on decoder 201.

When a video bitstream is inputted from a video encoder (e.g., encoder 101), the input bitstream may be decoded by decoder 201 in a procedure opposite to that of the video encoder. Thus, some details of decoding that are described above with respect to encoding may be skipped for ease of description. Decoding module 402 may be configured to decode the bitstream to obtain various information encoded into the bitstream, such as the quantization level of each position in the coding block. In some embodiments, decoding module 402 may perform entropy decoding (decompressing) corresponding to the entropy encoding (compressing) performed by the encoder, such as, for example, VLC, CAVLC, CABAC, SBAC, PIPE coding, and the like to obtain the binary representation (e.g., binary bins). Decoding module 402 may further convert the binary representations to quantization levels using Golomb-Rice binarization, including, for example, EGk binarization and combined TR and limited EGk binarization. Besides the quantization levels of the positions in the transform units, decoding module 402 may decode various other information, such as the parameters used for Golomb-Rice binarization (e.g., the Rice parameter), block type information of a coding unit, prediction mode information, partitioning unit information, prediction unit information, transmission unit information, motion vector information, reference frame information, block interpolation information, and filtering information. During the decoding process, decoding module 402 may perform rearrangement on the bitstream to reconstruct and rearrange the data from a 1D order into a 2D rearranged block through a method of inverse-scanning based on the coding scan order used by the encoder.

Consistent with the scope of the present disclosure, decoding module 402 may parse the bitstream to obtain the values of various syntax elements related to header extension parameters at different levels as disclosed herein, such as the general flag indicative of the presence of header extension parameters, the sequence-level flags of various header extension parameters, and the various slice-level header extension parameters. In some embodiments, decoding module 402 may perform conditional parsing of a group of syntax elements under the same condition, e.g., the presence of header extension parameters, as described above in detail. Depending on the result of the condition check, the parsing of lower-level syntax elements may be skipped. For example, the parsing of slice-level flags may not need to be performed by decoder 201 if the condition check at the sequence level does not pass, thereby simplifying the process performed by decoder 201. If the condition check at the sequence level passes, decoding module 402 may obtain the values of the header extension parameters for the specific slice and decode the slice based on the obtained values.

Dequantization module 404 may be configured to dequantize the quantization level of each position of the coding block (e.g., the 2D reconstructed block) to obtain the coefficient of each position. In some embodiments, dequantization module 404 may perform dependent dequantization based on quantization parameters provided by the encoder as well, including the information related to the quantizers used in dependent quantization, for example, the quantization step size used by each quantizer.

Inverse transform module 406 may be configured to perform inverse transformation, for example, inverse DCT, inverse DST, and inverse KLT, for DCT, DST, and KLT performed by the encoder, respectively, to transform the data from the transform domain (e.g., coefficients) back to the pixel domain (e.g., luma and/or chroma information). In some embodiments, inverse transform module 406 may selectively perform a transform operation (e.g., DCT, DST, KLT) according to a plurality of pieces of information such as a prediction method, the size of the current block, a prediction direction, and the like.

Inter prediction module 408 and intra prediction module 410 may be configured to generate a prediction block based on information related to the generation of a prediction block provided by decoding module 402 and information of a previously decoded block or picture provided by buffer module 414. As described above, if the size of the prediction unit and the size of the transform unit are the same when intra prediction is performed in the same manner as the operation of the encoder, intra prediction may be performed on the prediction unit based on the pixel existing on the left side, the pixel on the top-left side, and the pixel on the top of the prediction unit. However, if the size of the prediction unit and the size of the transform unit are different when intra prediction is performed, intra prediction may be performed using a reference pixel based on a transform unit.

The reconstructed block or reconstructed picture combined from the outputs of inverse transform module 406 and prediction module 408 or 410 may be provided to filter module 412. Filter module 412 may include a deblocking filter, an offset correction module, and an ALF. Buffer module 414 may store the reconstructed picture or block and use it as a reference picture or a reference block for inter prediction module 408 and may output the reconstructed picture.

Consistent with the scope of the present disclosure, encoding module 320 and decoding module 402 may be configured to implement various schemes disclosed herein to improve the efficiency and reduce the complexity of organizing and parsing the representation of syntax elements in video coding.

Figure 9:
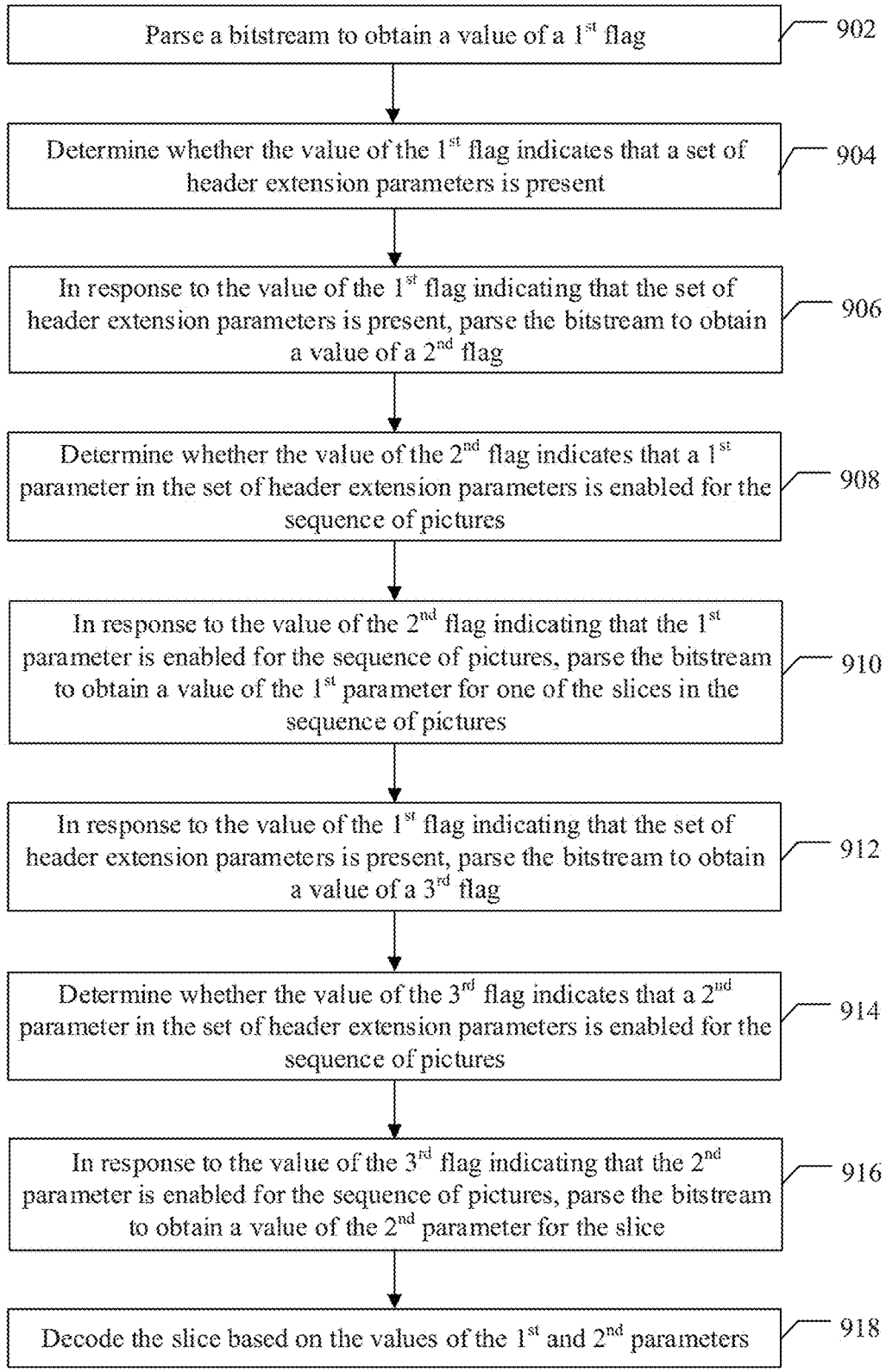
FIG. 9 illustrates a flow chart of an exemplary method of video decoding, according to some embodiments of the present disclosure.

FIG. 9 illustrates a flow chart of an exemplary method 900 of video decoding, according to some embodiments of the present disclosure. Method 900 may be performed at the sequence and slice levels by decoder 201 of decoding system 200 or any other suitable video decoding systems. Method 900 may include operations 902, 904, 906, 908, 910, 912, 914, 916, and 918, as described below. It is understood that some of the operations may be optional, and some of the operations may be performed simultaneously, or in a different order than shown in FIG. 9.

At operation 902, a bitstream is parsed to obtain a value of a first flag. The value of the first flag indicates whether a set of header extension parameters is present. For example, as shown in FIG. 4, decoding module 402 may be configured to parse the input bitstream to obtain the value (e.g., "0" or "1") of the general flag (pps_slice_header_extension_present_flag).

At operation 904, whether the value of the first flag indicates that a set of header extension parameters is present is determined. For example, as shown in FIG. 4, decoding module 402 may be configured to determine that value "1" of the general flag indicates that header extension parameters are present, while the value "0" indicates that header extension parameters are not present.

At operation 906, in response to the value of the first flag indicating that the set of header extension parameters is present, the bitstream is parsed to obtain a value of a second flag. The value of the second flag indicates whether a first parameter in the set of header extension parameters is enabled for the sequence of pictures. The first parameter can include a last significant coefficient reverse flag indicative of a reference position for referencing a position of the last significant coefficient, a high throughput mode flag indicative of whether the slice is encoded in the high throughput mode, or a residual data bit shift flag indicative of whether residual data bit shifts in residual coding of the slice. For example, as shown in FIG. 4, only if decoding module 402 determines that header extension parameters are present, decoding module 402 may be configured to further parse the input bitstream to obtain the value (e.g., "0" or "1") of a specific sequence-level flag of a header extension parameter (sps_shift_residual_data_enabled_flag, sps_reverse_last_sig_coeff_enabled_flag, or sps_high_throughput_flag). Otherwise, decoding module 402 may not further parse the input bitstream to obtain the values of any specific sequence-level flags of header extension parameters.

At operation 908, whether the value of the second flag indicates that the first parameter in the set of header extension parameters is enabled for the sequence of pictures is determined. For example, as shown in FIG. 4, decoding module 402 may be configured to determine that value "1" of the specific sequence-level flag indicates that the corresponding header extension parameter is enabled for the sequence, while the value "0" indicates that the corresponding header extension parameter is disabled for the sequence.

At operation 910, in response to the value of the second flag indicating that the first parameter is enabled for the sequence of pictures, the bitstream is parsed to obtain a value of the first parameter for one of the slices in the sequence of pictures. For example, as shown in FIG. 4, only if decoding module 402 determines that the corresponding header extension parameter is enabled for the sequence, decoding module 402 may be configured to further parse the input bitstream to obtain the value of the corresponding header extension parameter (sh_shift_residual_data_flag, slice_flagshift_luma/slice_flagshift_chroma, sh_reverse_last_sig_coeff_flag, or sh_high_throughput_mode_flag). Otherwise, decoding module 402 may not further parse the input bitstream to obtain the value of the corresponding header extension parameter.

Optionally, at operation 912, in response to the value of the first flag indicating that the set of header extension parameters is present, the bitstream is parsed to obtain a value of a third flag. The value of the third flag indicates whether a second parameter in the set of header extension parameters is also enabled for the sequence of pictures. The second parameter can include the last significant coefficient reverse flag, the high throughput mode flag, or a residual data bit shift flag indicative of whether residual data bit shifts in residual coding of the slice. For example, as shown in FIG. 4, only if decoding module 402 determines that header extension parameters are present for the sequence, decoding module 402 may be configured to further parse the input bitstream to obtain the value (e.g., "0" or "1") of another specific sequence-level flag of another header extension parameter (sps_shift_residual_data_enabled_flag, sps_reverse_last_sig_coeff_enabled_flag, or sps_high_throughput_flag).

Optionally, at operation 914, whether the value of the third flag indicates that the second parameter in the set of header extension parameters is enabled for the sequence of pictures is determined. For example, as shown in FIG. 4, decoding module 402 may be configured to determine that value "1" of the other specific sequence-level flag indicates that the corresponding other header extension parameter is enabled for the sequence, while the value "0" indicates that the corresponding other header extension parameter is disabled for the sequence.

Optionally, at operation 916, in response to the value of the third flag indicating that the second parameter is enabled for the sequence of pictures, the bitstream is parsed to obtain a value of the second parameter for the slice. For example, as shown in FIG. 4, only if decoding module 402 determines that the corresponding other header extension parameter is enabled for the sequence, decoding module 402 may be configured to further parse the input bitstream to obtain the value of the corresponding header extension parameter (sh__shift_residual_data_flag, slice_flagshift_luma/slice_flagshift_chroma, sh_reverse_last_sig_coeff_flag, or sh_high_throughput_mode_flag). Otherwise, decoding module 402 may not further parse the input bitstream to obtain the value of the corresponding other header extension parameter.

At operation 918, the slice is decoded based on the values of the first and second parameters for the slice. For example, as shown in FIG. 4, decoding module 402 may be configured to decode the slice based on the obtained values of the header extension parameters, such as the reference position for referencing a position of the last significant coefficient, whether the slice is encoded in the high throughput mode, and/or the number of shifted bits in luma/chroma residual coding of the slice.

Figure 10:
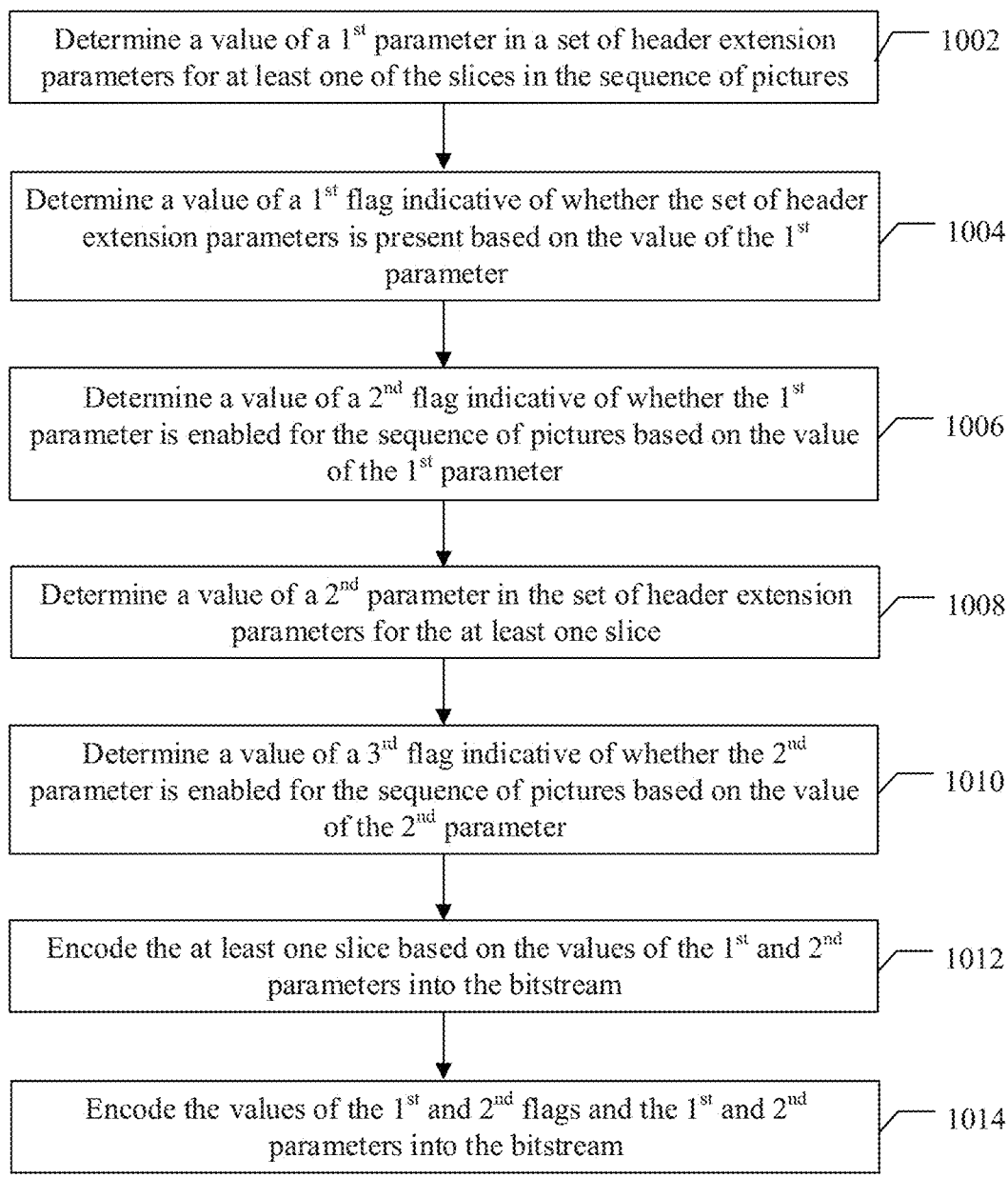
FIG. 10 illustrates a flow chart of an exemplary method of video encoding, according to some embodiments of the present disclosure.

FIG. 10 illustrates a flow chart of an exemplary method 1000 of video encoding, according to some embodiments of the present disclosure. Method 1000 may be performed at the transform unit level by encoder 101 of encoding system 100 or any other suitable video encoding systems. Method 1000 may include operations 1002, 1004, 1006, 1008, 1010, 1012, and 1014 as described below. It is understood that some of the operations may be optional, and some of the operations may be performed simultaneously, or in a different order other than shown in FIG. 10.

At operation 1002, a value of a first parameter in a set of header extension parameters for at least one of the slices in a sequence of pictures is determined. The first parameter can include a last significant coefficient reverse flag indicative of a reference position for referencing a position of the last significant coefficient, a high throughput mode flag indicative of whether the slice is encoded in the high throughput mode, or a residual data bit shift flag indicative of whether residual data bit shifts in residual coding of the at least one slice. For example, as shown in FIG. 3, encoding module 320 may be configured to determine that the value of any one of the slice-level flags (sh_shift_residual_data_flag, sh_reverse_last_sig_coeff_flag, or sh_high_throughput_mode_flag) is equal to "1" if the corresponding header extension parameter needs to be used in at least one slice when encoding the slice (e.g., in high throughput mode, using alternative coordinates for coding the last significant coefficient, or applying residual data bit shifts in residual coding).

At operation 1004, a value of a first flag indicative of whether the set of header extension parameters is present is determined based on the value of the first parameter For example, as shown in FIG. 3, encoding module 320 may determine the value ("0" or "1") of the general flag (pps_slice_header_extensionpresent_flag) based on the determined value ("0" or "1") of one of the header extension parameters For example, if the value of one of the slice-level flags (sh_shift_residual_data_flag, sh_reverse_last_sig_coeff_flag, or sh_high_throughput_mode_flag) is equal to "1," meaning that the corresponding header extension parameter needs to be used in encoding at least one slice, the value of the general flag (pps_slice_header_extensionpresent_flag) may be determined to be equal to "1" as well, indicating the presence of header extension parameters.

At operation 1006, a value of a second flag indicative of whether the first parameter is enabled for the sequence of pictures is determined based on the value of the first parameter. For example, as shown in FIG. 3, encoding module 320 may also determine the value ("0" or "1") of the corresponding sequence-level flag (sps_shift_residual_data_enabled_flag, sps_reverse_last_sig_coeff_enabled_flag, or sps_high_throughput_flag) based on the determined value ("0" or "1") of the header extension parameter. For example, if the value of one of the slice-level flags (sh_shift_residual_data_flag, sh_reverse_last_sig_coeff_flag, or sh_high_throughput_mode_flag) is equal to "1," meaning that the corresponding header extension parameter needs to be used in encoding at least one slice, the value of the corresponding sequence-level flag (sps_shift_residual_data_enabled_flag, sps_reverse_last_sig_coeff_enabled_flag, or sps_high_throughput_flag) may be determined to be equal to "1" as well, indicating the enablement of the header extension parameter at the sequence level.

Optionally, at operation 1008, a value of a second parameter in the set of header extension parameters for the at least one slice is determined. The second parameter can include the last significant coefficient reverse flag indicative of a reference position for referencing a position of the last significant coefficient, the high throughput mode flag indicative of whether the slice is encoded in the high throughput mode, or the residual data bit shift flag indicative of whether residual data bit shifts in residual coding of the at least one slice. For example, as shown in FIG. 3, encoding module 320 may be configured to determine that the value of another one of the slice-level flags (sh_shift_residual_data_flag, sh_reverse_last_sig_coeff_flag, or sh_high_throughput_mode_flag) is also equal to "1" if the corresponding another header extension parameter needs to be used in at least one slice when encoding the slice (e.g., in high throughput mode, using alternative coordinates for coding the last significant coefficient, or applying residual data bit shifts in residual coding).

Optionally, at operation 1010, a value of a third flag indicative of whether the second parameter is enabled for the sequence of pictures is determined based on the value of the second parameter. For example, as shown in FIG. 3, encoding module 320 may also determine the value ("0" or "1") of the corresponding sequence-level flag (sps_shift_residual_data_enabled_flag, sps_reverse_last_sig_coeff_enabled_flag, or sps_high_throughput_flag) based on the determined value ("0" or "1") of the other header extension parameter. For example, if the value of the other one of the slice-level flags (sh_shift_residual_data_flag, sh_reverse_last_sig_coeff_flag, or sh_high_throughput_mode_flag) is equal to "1," meaning that the corresponding other header extension parameter needs to be used in encoding at least one slice, the value of the corresponding sequence-level flag (sps_shift_residual_data_enabled_flag, sps_reverse_last_sig_coeff_enabled_flag, or sps_high_throughput_flag) may be determined to be equal to "1" as well, indicating the enablement of the other header extension parameter at the sequence level.

At operation 1012, the slice is encoded into a bitstream based on the values of the first and second parameters for the slice. For example, as shown in FIG. 3, encoding module 320 may be configured to encode the slice based on the values of the header extension parameters, such as the reference position for referencing a position of the last significant coefficient, whether the slice is encoded in the high throughput mode, and/or the number of shifted bits in luma/chroma residual coding of the slice.

At operation 1014, the values of the first and second flags and the first and second parameters are encoded into the bitstream as well. For example, as shown in FIG. 3, encoding module 320 may be configured to encode the obtained values of the general flag, the sequence-level flags, as well as the values of the header extension parameters, into the bitstream.

In various aspects of the present disclosure, the functions described herein may be implemented in hardware, software, firmware, or any combination thereof. If implemented in software, the functions may be stored as instructions on a non-transitory computer-readable medium. Computer-readable media includes computer storage media. Storage media may be any available media that can be accessed by a processor, such as processor 102 in FIGS. 1 and 2. By way of example, and not limitation, such computer-readable media can include RAM, ROM, EEPROM, CD-ROM or other optical disk storage, HDD, such as magnetic disk storage or other magnetic storage devices, Flash drive, SSD, or any other medium that can be used to carry or store desired program code in the form of instructions or data structures and that can be accessed by a processing system, such as a mobile device or a computer. Disk and disc, as used herein, includes CD, laser disc, optical disc, digital video disc (DVD), and floppy disk where disks usually reproduce data magnetically, while discs reproduce data optically with lasers. Combinations of the above should also be included within the scope of computer-readable media.

According to one aspect of the present disclosure, a method for decoding a video is disclosed. The video includes a sequence of pictures, and each picture includes one or more slices. A bitstream is parsed by a processor to obtain a value of a first flag. Whether the value of the first flag indicates that a set of header extension parameters is present is determined by the processor. In response to the value of the first flag indicating that the set of header extension parameters is present, the bitstream is parsed by the processor to obtain a value of a second flag. Whether the value of the second flag indicates that a first parameter in the set of header extension parameters is enabled for the sequence of pictures is determined by the processor. In response to the value of the second flag indicating that the first parameter is enabled for the sequence of pictures, the bitstream is parsed to obtain a value of the first parameter for one of the slices in the sequence of pictures. The slice is decoded by the processor based on the value of the first parameter for the slice.

In some embodiments, the first parameter includes a last significant coefficient reverse flag indicative of a reference position for referencing a position of the last significant coefficient.

In some embodiments, the first parameter includes a high throughput mode flag indicative of whether the slice is encoded in the high throughput mode.

In some embodiments, the first parameter includes a residual data bit shift flag indicative of whether residual data bit shifts in residual coding of the slice.

In some embodiments, the value of the second flag is encoded in a header extension of the sequence of pictures.

In some embodiments, the value of the first parameter is encoded in a header of the slice.

In some embodiments, in response to the value of the first flag indicating that the set of header extension parameters is present, the bitstream is parsed by the processor to obtain a value of a third flag. In some embodiments, whether the value of the third flag indicates that a second parameter in the set of header extension parameters is enabled for the sequence of pictures is determined by the processor. In some embodiments, in response to the value of the third flag indicating that the second parameter is enabled for the sequence of pictures, the bitstream is parsed by the processor to obtain a value of the second parameter for the slice. In some embodiments, the slice is decoded by the processor based on the values of the first and second parameters for the slice.

According to another aspect of the present disclosure, a system for decoding a video includes a memory configured to store instructions and a processor coupled to the memory. The video includes a sequence of pictures, and each picture includes one or more slices. The processor is configured to, upon executing the instructions, parse a bitstream to obtain a value of a first flag. The processor is also configured to, upon executing the instructions, determine whether the value of the first flag indicates that a set of header extension parameters is present, and in response to the value of the first flag indicating that the set of header extension parameters is present, parse the bitstream to obtain a value of a second flag. The processor is further configured to, upon executing the instructions, determine whether the value of the second flag indicates that a first parameter in the set of header extension parameters is enabled for the sequence of pictures, and in response to the value of the second flag indicating that the first parameter is enabled for the sequence of pictures, parse the bitstream to obtain a value of the first parameter for one of the slices in the sequence of pictures. The processor is further configured to, upon executing the instructions, decode the slice based on the value of the first parameter for the slice.

In some embodiments, the first parameter includes a last significant coefficient reverse flag indicative of a reference position for referencing a position of the last significant coefficient.

In some embodiments, the first parameter includes a high throughput mode flag indicative of whether the slice is encoded in the high throughput mode.

In some embodiments, the first parameter includes a residual data bit shift flag indicative of whether residual data bit shifts in residual coding of the slice.

In some embodiments, the value of the second flag is encoded in a header extension of the sequence of pictures.

In some embodiments, the value of the first parameter is encoded in a header of the slice.

In some embodiments, the processor is further configured to in response to the value of the first flag indicating that the set of header extension parameters is present, parse the bitstream to obtain a value of a third flag. In some embodiments, the processor is further configured to determine whether the value of the third flag indicates that a second parameter in the set of header extension parameters is enabled for the sequence of pictures. In some embodiments, the processor is further configured to in response to the value of the third flag indicating that the second parameter is enabled for the sequence of pictures, parse the bitstream to obtain a value of the second parameter for the slice. In some embodiments, the processor is further configured to decode the slice based on the values of the first and second parameters for the slice.

According to still another aspect of the present disclosure, a method for encoding a video is disclosed. The video includes a sequence of pictures, and each picture includes one or more slices. A value of a first parameter in a set of header extension parameters for at least one of the slices in the sequence of pictures is determined by a processor. A value of a first flag indicative of whether the set of header extension parameters is present is determined by the processor based on the value of the first parameter. A value of a second flag indicative of whether the first parameter is enabled for the sequence of pictures is determined based on the value of the first parameter. The at least one slice is encoded by the processor based on the value of the first parameter into a bitstream. The values of the first flag, the second flag, and the first parameter are encoded by the processor into the bitstream.

In some embodiments, the first parameter includes a last significant coefficient reverse flag indicative of a reference position for referencing a position of the last significant coefficient.

In some embodiments, the first parameter includes a high throughput mode flag indicative of whether the at least one slice is encoded in the high throughput mode.

In some embodiments, the first parameter includes a residual data bit shift flag indicative of whether residual data bit shifts in residual coding of the at least one slice.

In some embodiments, the value of the second flag is encoded in a header extension of the sequence of pictures.

In some embodiments, the value of the first parameter is encoded in a header of the at least one slice.

In some embodiments, a value of a second parameter in a set of header extension parameters for the at least one slice is determined by the processor. In some embodiments, a value of a third flag indicative of whether the second parameter is enabled for the sequence of pictures is determined by the processor based on the value of the second parameter. In some embodiments, the at least one slice is encoded by the processor based on the values of the first and second parameters into the bitstream. In some embodiments, the values of the first and second flags and the first and second parameters are encoded by the processor into the bitstream.

According to yet another aspect of the present disclosure, a system for encoding a video includes a memory configured to store instructions and a processor coupled to the memory. The video includes a sequence of pictures, and each picture includes one or more slices. The processor is configured to, upon executing the instructions, determine a value of a first parameter in a set of header extension parameters for at least one of the slices in the sequence of picture. The processor is also configured to, upon executing the instructions, determine a value of a first flag indicative of whether the set of header extension parameters is present based on the value of the first parameter. The processor is further configured to, upon executing the instructions, determine a value of a second flag indicative of whether the first parameter is enabled for the sequence of pictures based on the value of the first parameter. The processor is further configured to, upon executing the instructions, encode the at least one slice based on the value of the first parameter into a bitstream, and encode the values of the first flag, the second flag, and the first parameter into the bitstream.

In some embodiments, the first parameter includes a last significant coefficient reverse flag indicative of a reference position for referencing a position of the last significant coefficient.

In some embodiments, the first parameter includes a high throughput mode flag indicative of whether the at least one slice is encoded in the high throughput mode.

In some embodiments, the first parameter includes a residual data bit shift flag indicative of whether residual data bit shifts in residual coding of the at least one slice.

In some embodiments, the value of the second flag is encoded in a header extension of the sequence of pictures.

In some embodiments, the value of the first parameter is encoded in a header of the at least one slice.

In some embodiments, the processor is further configured to determine a value of a second parameter in a set of header extension parameters for the at least one slice. In some embodiments, the processor is further configured to determine a value of a third flag indicative of whether the second parameter is enabled for the sequence of pictures based on the value of the second parameter. In some embodiments, the processor is further configured to encode the at least one slice based on the values of the first and second parameters into the bitstream. In some embodiments, the processor is further configured to encode the values of the first and second flags and the first and second parameters into the bitstream.

The foregoing description of the embodiments will so reveal the general nature of the present disclosure that others can, by applying knowledge within the skill of the art, readily modify and/or adapt for various applications such embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

Embodiments of the present disclosure have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The Summary and Abstract sections may set forth one or more but not all exemplary embodiments of the present disclosure as contemplated by the inventor(s), and thus, are not intended to limit the present disclosure and the appended claims in any way. Various functional blocks, modules, and steps are disclosed above. The arrangements provided are illustrative and without limitation. Accordingly, the functional blocks, modules, and steps may be reordered or combined in different ways than in the examples provided above. Likewise, some embodiments include only a subset of the functional blocks, modules, and steps, and any such subset is permitted.

The breadth and scope of the present disclosure should not be limited by any of the above-described exemplary embodiments, but should be defined only in accordance with the following claims and their equivalents.

What is claimed is:

1. A method for decoding a video comprising a sequence of pictures, each picture comprising one or more slices, the method comprising:
    parsing, by a processor, a bitstream to obtain a value of a first flag;
    determining, by the processor, whether the value of the first flag indicates that a set of header extension parameters is present;
    in response to the value of the first flag indicating that the set of header extension parameters is present, parsing, by the processor, the bitstream to obtain a value of a second flag;
    determining, by the processor, whether the value of the second flag indicates that a first parameter in the set of header extension parameters is enabled for the sequence of pictures;
    in response to the value of the second flag indicating that the first parameter is enabled for the sequence of pictures, parsing, by the processor, the bitstream to obtain a value of the first parameter for one of the slices in the sequence of pictures; and decoding, by the processor, the slice based on the value of the first parameter for the slice.

2. The method of claim 1, wherein the first parameter comprises a last significant coefficient reverse flag indicative of a reference position for referencing a position of the last significant coefficient.

3. The method of claim 1, wherein the first parameter comprises a high throughput mode flag indicative of whether the slice is encoded in the high throughput mode.

4. The method of claim 1, wherein the value of the first parameter is encoded in a header of the slice.

5. The method of claim 1, further comprising:
in response to the value of the first flag indicating that the set of header extension parameters is present, parsing, by the processor, the bitstream to obtain a value of a third flag;
determining, by the processor, whether the value of the third flag indicates that a second parameter in the set of header extension parameters is enabled for the sequence of pictures;
in response to the value of the third flag indicating that the second parameter is enabled for the sequence of pictures, parsing, by the processor, the bitstream to obtain a value of the second parameter for the slice; and
decoding, by the processor, the slice based on the values of the first and second parameters for the slice.

6. A system for decoding a video comprising a sequence of pictures, each picture comprising one or more slices, the system comprising:
a memory configured to store instructions; and
a processor coupled to the memory and configured to, upon executing the instructions:
parse a bitstream to obtain a value of a first flag;
determine whether the value of the first flag indicates that a set of header extension parameters is present;
in response to the value of the first flag indicating that the set of header extension parameters is present, parse the bitstream to obtain a value of a second flag;
determine whether the value of the second flag indicates that a first parameter in the set of header extension parameters is enabled for the sequence of pictures;
in response to the value of the second flag indicating that the first parameter is enabled for the sequence of pictures, parse the bitstream to obtain a value of the first parameter for one of the slices in the sequence of pictures; and
decode the slice based on the value of the first parameter for the slice.

7. The system of claim 6, wherein the first parameter comprises a last significant coefficient reverse flag indicative of a reference position for referencing a position of the last significant coefficient.

8. The system of claim 6, wherein the value of the second flag is encoded in a header extension of the sequence of pictures.

9. The system of claim 6, wherein the value of the first parameter is encoded in a header of the slice.

10. The system of claim 6, wherein the processor is further configured to:
in response to the value of the first flag indicating that the set of header extension parameters is present, parse the bitstream to obtain a value of a third flag;
determine whether the value of the third flag indicates that a second parameter in the set of header extension parameters is enabled for the sequence of pictures;
in response to the value of the third flag indicating that the second parameter is enabled for the sequence of pictures, parse the bitstream to obtain a value of the second parameter for the slice; and
decode the slice based on the values of the first and second parameters for the slice.

11. A method for encoding a video comprising a sequence of pictures, each picture comprising one or more slices, the method comprising:
determining, by a processor, a value of a first parameter in a set of header extension parameters for at least one of the slices in the sequence of pictures;
determining, by the processor, a value of a first flag indicative of whether the set of header extension parameters is present based on the value of the first parameter;
determining, by the processor, a value of a second flag indicative of whether the first parameter is enabled for the sequence of pictures based on the value of the first parameter;
encoding, by the processor, the at least one slice based on the value of the first parameter into a bitstream; and
encoding, by the processor, the values of the first flag, the second flag, and the first parameter into the bitstream.

12. The method of claim 11, wherein the first parameter comprises a last significant coefficient reverse flag indicative of a reference position for referencing a position of the last significant coefficient.

13. The method of claim 11, wherein the value of the second flag is encoded in a header extension of the sequence of pictures.

14. The method of claim 11, wherein the value of the first parameter is encoded in a header of the at least slice.

15. The method of claim 11, further comprising:
determining, by the processor, a value of a second parameter in a set of header extension parameters for the at least one slice;
determining, by the processor, a value of a third flag indicative of whether the second parameter is enabled for the sequence of pictures based on the value of the second parameter
encoding, by the processor, the at least one slice based on the values of the first and second parameters into the bitstream; and
encoding, by the processor, the values of the first and second flags and the first and second parameters into the bitstream.

16. A system for encoding a video comprising a sequence of pictures, each picture comprising one or more slice, the system comprising:
a memory configured to store instructions; and
a processor coupled to the memory and configured to, upon executing the instructions:
determine a value of a first parameter in a set of header extension parameters for at least one of the slices in the sequence of pictures;
determine a value of a first flag indicative of whether the set of header extension parameters is present based on the value of the first parameter;
determine a value of a second flag indicative of whether the first parameter is enabled for the sequence of pictures based on the value of the first parameter;
encode the at least one slice based on the value of the first parameter into a bitstream; and
encode the values of the first flag, the second flag, and the first parameter into the bitstream.

17. The system of claim 16, wherein the first parameter comprises a last significant coefficient reverse flag indicative of a reference position for referencing a position of the last significant coefficient.

18. The system of claim 16, wherein the value of the second flag is encoded in a header extension of the sequence of pictures.

19. The system of claim 16, wherein the value of the first parameter is encoded in a header of the at least slice.

20. The system of claim 16, wherein the processor is further configured to:
- determine a value of a second parameter in a set of header extension parameters for the at least one slice;
- determine a value of a third flag indicative of whether the second parameter is enabled for the sequence of pictures based on the value of the second parameter;
- encode the at least one slice based on the values of the first and second parameters into the bitstream; and
- encode the values of the first and second flags and the first and second parameters into the bitstream.

* * * * *